United States Patent
Toyota et al.

(10) Patent No.: US 7,426,975 B2
(45) Date of Patent: Sep. 23, 2008

(54) VEHICLE REGENERATIVE BRAKING CONTROL APPARATUS AND METHOD

(75) Inventors: Hiromitsu Toyota, Kanagawa (JP); Youichi Isono, Tochigi (JP); Tomonaga Sugimoto, Kanagawa (JP); Yoshiyuki Izu, Kanagawa (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 161 days.

(21) Appl. No.: 11/366,444

(22) Filed: Mar. 3, 2006

(65) Prior Publication Data
US 2006/0196712 A1 Sep. 7, 2006

(30) Foreign Application Priority Data
Mar. 4, 2005 (JP) .............................. 2005-061298

(51) Int. Cl.
*B60K 6/00* (2007.10)
*B60K 8/00* (2006.01)
(52) U.S. Cl. ................... 180/165; 180/170; 180/168; 303/152
(58) Field of Classification Search ............... 180/65.2, 180/65.3, 65.8, 165, 197, 166, 170, 168; 701/89, 20, 22; 303/3, 152, 147, 166, 168, 303/169; 903/947
See application file for complete search history.

(56) References Cited

U.S. PATENT DOCUMENTS

| | | | | |
|---|---|---|---|---|
| 4,335,337 A | * | 6/1982 | Okamatsu et al. ............. 318/52 |
| 5,318,355 A | * | 6/1994 | Asanuma et al. ............... 303/3 |
| 5,343,970 A | * | 9/1994 | Severinsky .................. 180/65.2 |
| 5,476,310 A | * | 12/1995 | Ohtsu et al. ..................... 303/3 |
| 5,492,192 A | * | 2/1996 | Brooks et al. ............... 180/165 |
| 5,511,859 A | * | 4/1996 | Kade et al. ...................... 303/3 |
| 5,615,933 A | * | 4/1997 | Kidston et al. ............. 303/152 |
| 5,654,887 A | * | 8/1997 | Asa et al. ....................... 701/22 |
| 6,033,041 A | * | 3/2000 | Koga et al. .................. 303/152 |
| 6,598,945 B2 | * | 7/2003 | Shimada et al. ............. 303/152 |
| 6,691,013 B1 | | 2/2004 | Brown |
| 2001/0025219 A1 | * | 9/2001 | Ohba et al. .................... 701/89 |
| 2003/0230933 A1 | | 12/2003 | Schneider et al. |
| 2004/0046448 A1 | | 3/2004 | Brown |
| 2005/0029863 A1 | | 2/2005 | Brown et al. |

FOREIGN PATENT DOCUMENTS

JP 05-161209 A 6/1993

* cited by examiner

*Primary Examiner*—Hau V Phan
(74) *Attorney, Agent, or Firm*—Foley & Lardner LLP

(57) ABSTRACT

A regenerative braking control apparatus for a wheeled vehicle, includes: a regenerative braking unit arranged to produce a regenerative braking effort for the vehicle; and a control unit connected for signal communication to the regenerative braking unit, and configured to perform the following: measuring a wheel speed deviation defined as a difference between a speed of a front wheel set of the vehicle and a speed of a rear wheel set of the vehicle; and controlling the regenerative braking effort in accordance with the wheel speed deviation during cornering. The control unit is configured to control the regenerative braking effort to decrease with an increase in the wheel speed deviation during cornering braking, and configured to perform braking for the vehicle in accordance with an operation of slowdown request, prioritizing a regenerative braking effort for one of the front wheel set and the rear wheel set of the vehicle.

13 Claims, 15 Drawing Sheets

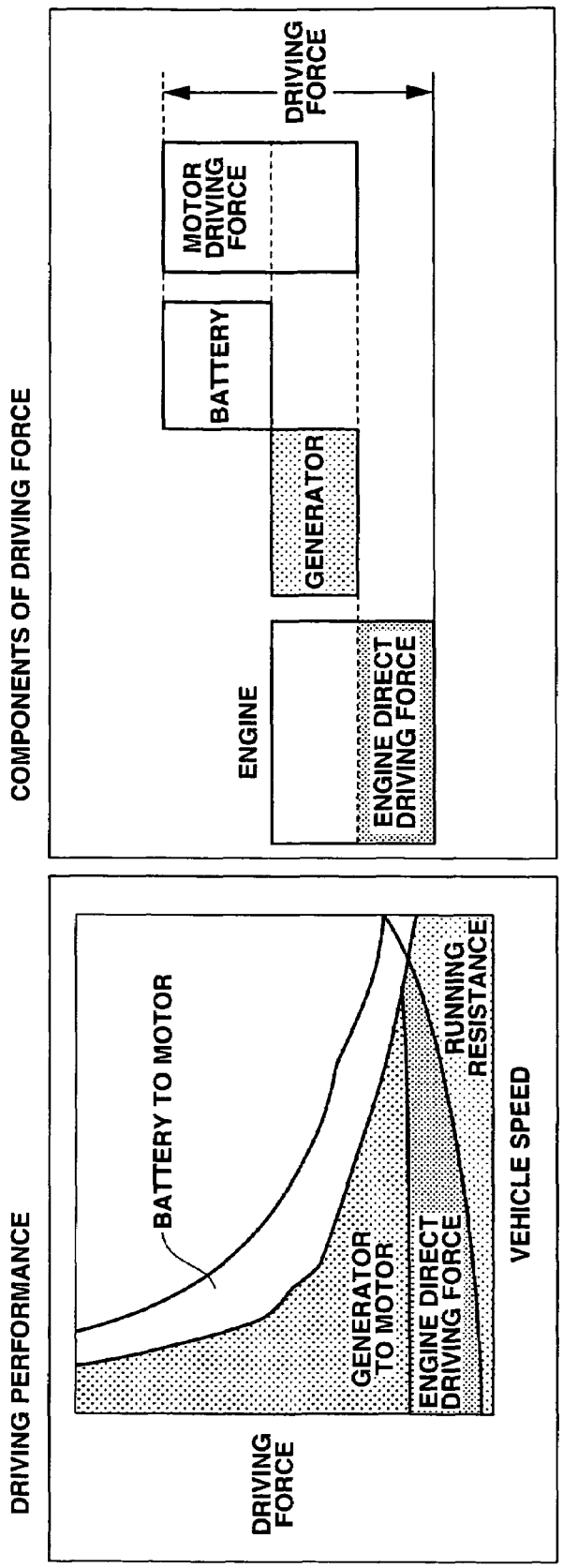

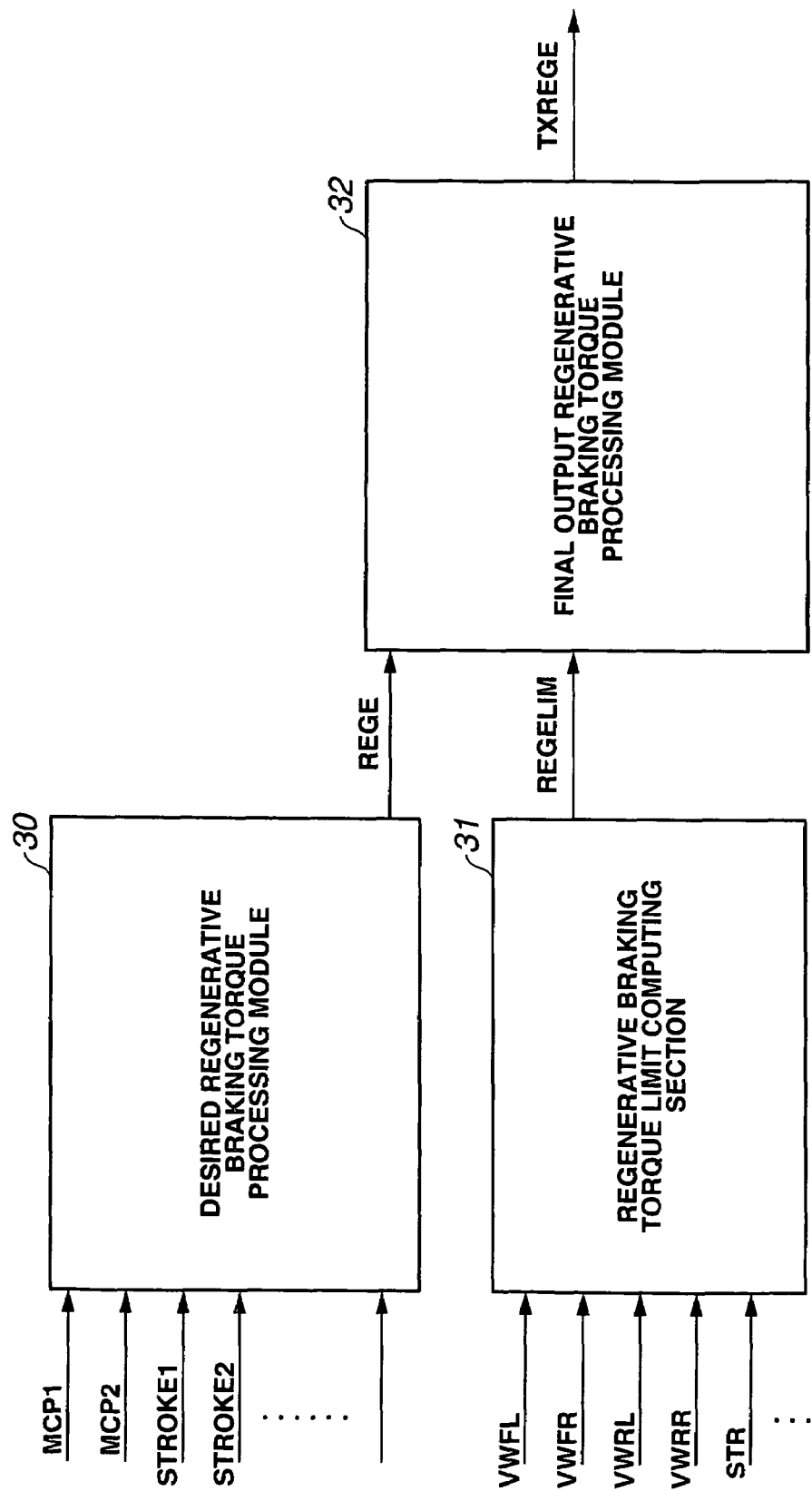

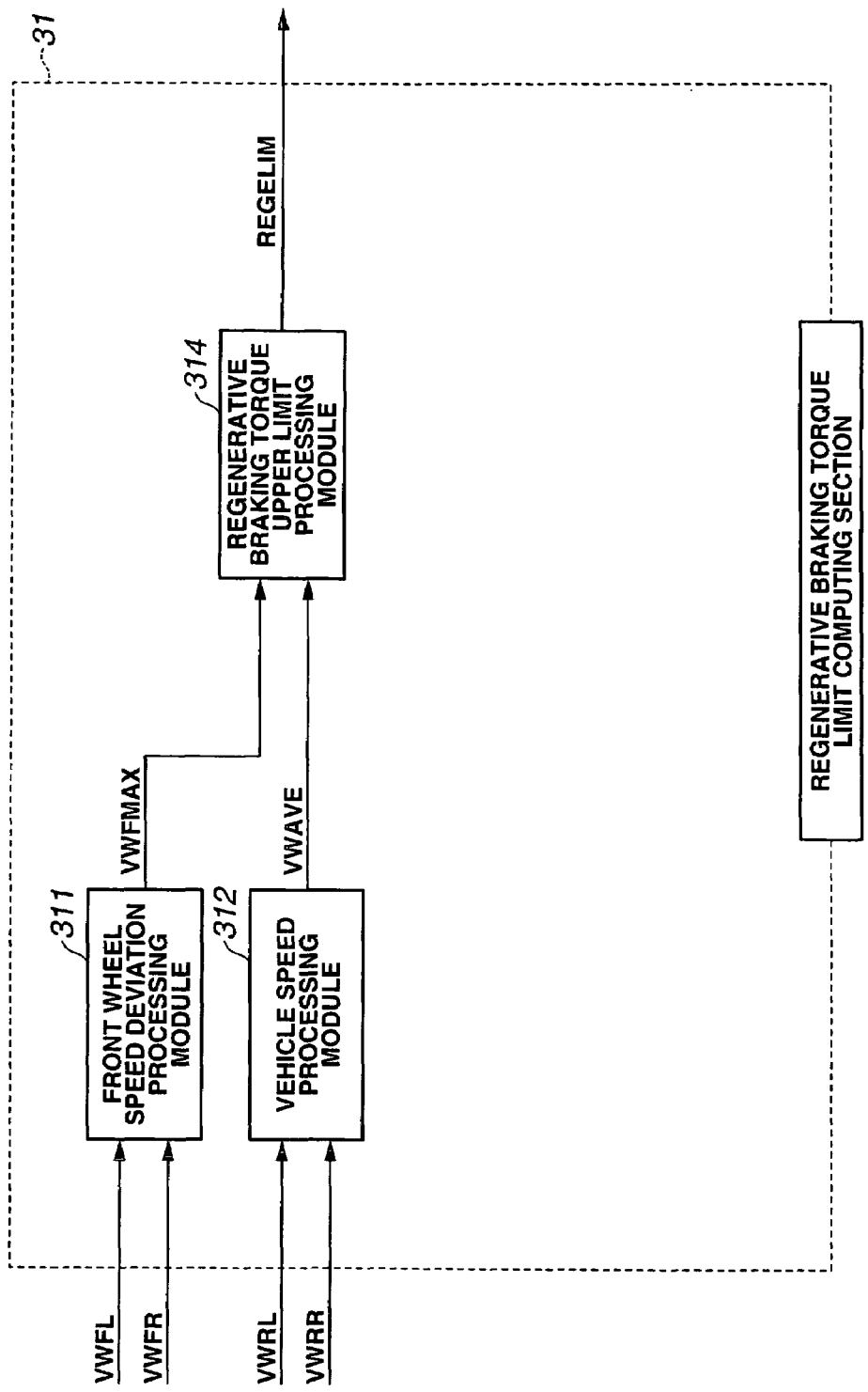

**HYDRAULIC-REGENERATIVE COOPERATIVE
BRAKING FOR 0.2G IN FRONT DRIVE VEHICLE**

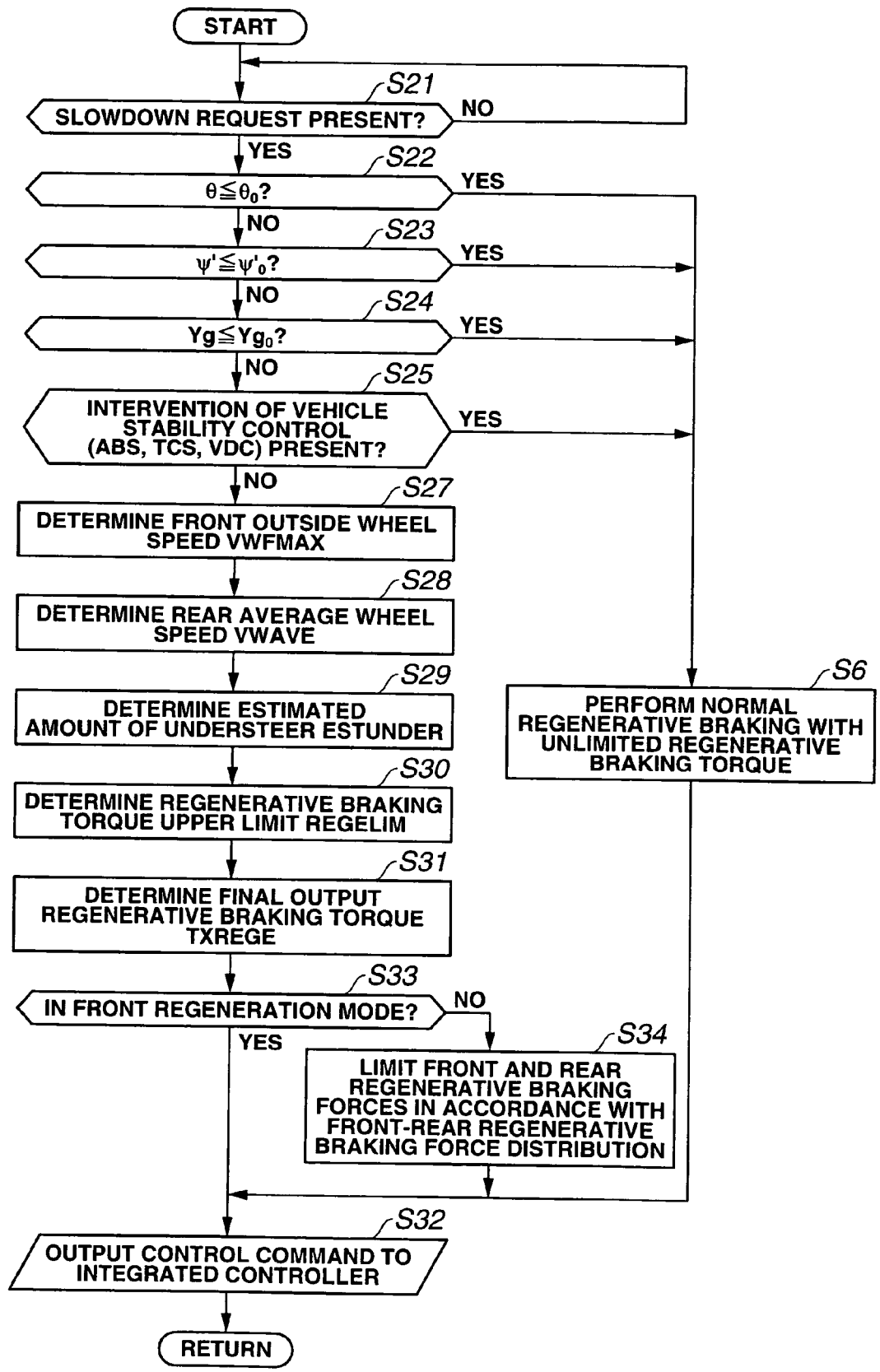

VEHICLE REGENERATIVE BRAKING CONTROL APPARATUS AND METHOD

BACKGROUND OF THE INVENTION

The present invention relates to vehicle regenerative braking control apparatus and method.

Japanese Published Patent Application No. 5-161209 (hereinafter referred to as "JP5-161209") shows an electric vehicle including an electric motor; a battery serving as an energy source for the electric motor; a non-driven wheel arranged to perform hydraulic braking according to operation of a brake operating device; a driving wheel connected to the electric motor and arranged to perform hydraulic braking and regenerative braking according to operation of the brake operating device; and a control unit configured to control a switch from a regenerative braking priority mode to an ideal distribution characteristic mode, wherein in the ideal distribution characteristic mode the braking force at the non-driven wheel and the braking force at the driving wheel are ideally distributed, and wherein in the regenerative braking priority mode the regenerative braking force at the driving wheel is weighted more than in the ideal distribution characteristic mode.

SUMMARY OF THE INVENTION

In JP5-161209, the regenerative braking is inhibited constantly during cornering, while the mode switch is controlled in order to prevent rapid change of the braking force at the switch between the regenerative braking priority mode and the usual braking mode. Accordingly, it is possible that the inhibition of the regenerative braking adversely affects the actual fuel economy of the vehicle.

Accordingly, it is an object of the present invention to control a regenerative braking in a vehicle to provide a high level of compatibility of the actual fuel economy of the vehicle and the cornering behavior stability of the vehicle.

According to one aspect of the present invention, a regenerative braking control apparatus for a wheeled vehicle, comprises: a regenerative braking unit arranged to produce a regenerative braking effort for the vehicle; and a control unit connected for signal communication to the regenerative braking unit, and configured to perform the following: measuring a wheel speed deviation defined as a difference between a speed of a front wheel set of the vehicle and a speed of a rear wheel set of the vehicle; and controlling the regenerative braking effort in accordance with the wheel speed deviation during cornering.

According to another aspect of the invention, a braking control apparatus for a vehicle, comprises: a non-regenerative braking unit arranged to produce a non-regenerative braking effort for the vehicle; a regenerative braking unit arranged to produce a regenerative braking effort for the vehicle; and a control unit connected for signal communication to the non-regenerative braking unit and the regenerative braking unit, and configured to perform the following: determining a desired regenerative braking effort in accordance with an operation of slowdown request; determining an undesirability indicator indicative of a degree of undesirability of cornering behavior of the vehicle under influence of the regenerative braking effort; controlling the regenerative braking effort in accordance with the desired regenerative braking effort and the undesirability indicator during cornering; and controlling the non-regenerative braking effort in accordance with the desired regenerative braking effort and the controlled regenerative braking effort.

According to a further aspect of the invention, a regenerative braking control apparatus for a wheeled vehicle, comprises: regenerative braking means for producing a regenerative braking effort for the vehicle; and control means for performing the following: measuring a wheel speed deviation defined as a difference between a speed of a front wheel set of the vehicle and a speed of a rear wheel set of the vehicle; and controlling the regenerative braking effort in accordance with the wheel speed deviation during cornering.

According to a still further aspect of the invention, a regenerative braking control method for a wheeled vehicle comprising a regenerative braking unit arranged to produce a regenerative braking effort for the vehicle, comprises: measuring a wheel speed deviation defined as a difference between a speed of a front wheel set of the vehicle and a speed of a rear wheel set of the vehicle; and controlling the regenerative braking effort in accordance with the wheel speed deviation during cornering.

BRIEF DESCRIPTION OF THE DRAWINGS

FIGS. 2A and 2B are views showing the driving performance of the hybrid electric vehicle of FIG. 1.

FIG. 5 is a block diagram showing a process of regenerative braking control in accordance with the first embodiment.

FIG. 6 is a block diagram showing a regenerative braking torque limit computing section 31 in the control process of FIG. 5.

FIG. 17 is a flow chart showing a process of regenerative braking control performed by brake controller 5 in accordance with the second embodiment.

DETAILED DESCRIPTION OF THE INVENTION

Figure 1:
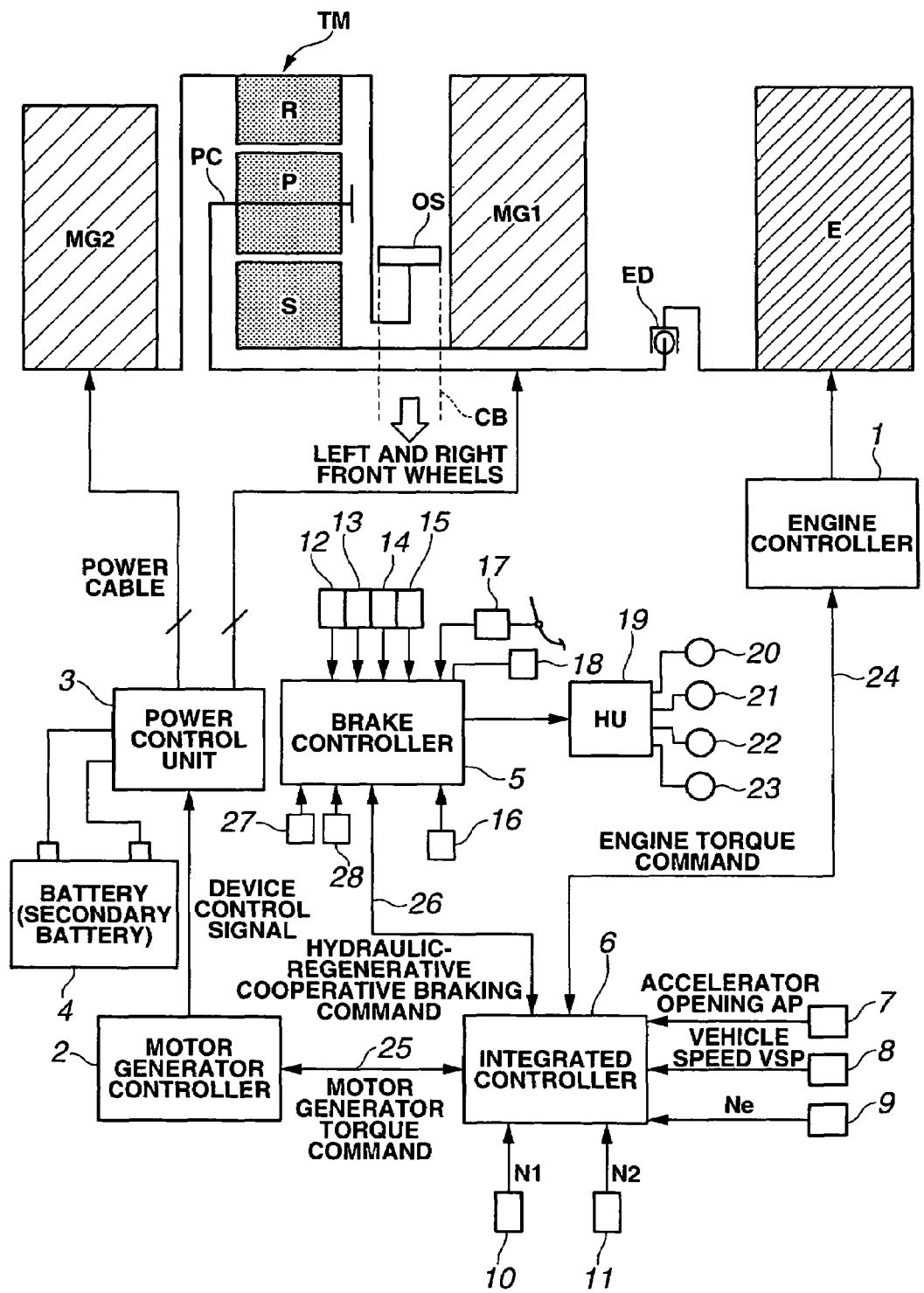
FIG. 1 is a schematic diagram showing a system of a front-wheel drive hybrid electric vehicle with a regenerative braking control apparatus in accordance with a first embodiment.

Referring now to FIGS. 1 through 15, there is shown a regenerative braking control apparatus and method in accordance with a first embodiment. FIG. 1 is a schematic diagram showing a system of a front-wheel drive hybrid electric vehicle with a regenerative braking control apparatus in accordance with a first embodiment. First, the following describes the drive system of the hybrid electric vehicle. As shown in FIG. 1, the drive system of the hybrid electric vehicle includes an engine E, a first motor generator MG1, a second motor generator MG2, an output sprocket OS, and a power split mechanism TM.

Engine E may be a gasoline engine or a diesel engine. The operating parameters of engine E such as the throttle opening of a throttle valve and the fuel injection are controlled in accordance with a control command from an engine controller 1 as described below.

First motor generator MG1 and second motor generator MG2 are each formed as a synchronous motor generator, which includes a rotor embedded in with a permanent magnet, and a stator wound around with a stator coil. First motor generator MG1 and second motor generator MG2 are each controlled individually by applying a three phase alternating current produced by a power control unit 3 in accordance with a control command from a motor generator controller 2 as described below. First motor generator MG1 and second motor generator MG2 are each configured to operate as an electric motor to rotate by electric power from a battery 4 (this operating state is hereafter called "acceleration" or "traction"), and to operate as an electric generator to generate an electromotive force between the both ends of the stator coil to charge battery 4 with electric power while the rotor is rotating by external force (this operating state is hereafter called "regeneration").

Power split mechanism TM includes a simple planetary gear including a sun gear S, a ring gear R, and a planet-pinion career PC carrying a planet pinion P engaged with sun gear S and ring gear R, where sun gear S, ring gear R, and planet-pinion carrier PC serve as three rotating elements of power split mechanism TM. Sun gear S is connected to first motor generator MG1. Ring gear R is connected to second motor generator MG2 and to output sprocket OS. Planet-pinion carrier PC is connected to engine E via an engine damper ED. Output sprocket OS is connected to right and left front wheels via a chain belt CB, a differential gear not shown, and a drive shaft not shown.

FIGS. 4A through 4E are lever diagrams showing operating modes of the hybrid electric vehicle of FIG. 1. Connected with power split mechanism TM as mentioned above, the set of the rotating elements are expressed by a rigid lever model where the points indicative of rotational speeds of the rotating elements are connected in a straight line in the lever diagrams of FIGS. 4A through 4E, and is arranged in order of first motor generator MG1 (sun gear S), engine E (planet-pinion carrier PC), and a set of second motor generator MG2 and output sprocket OS (ring gear R). A lever diagram indicates a common speed diagram that is used to simply find the rotational speeds of rotating elements by a geometrical method without an algebraic method when considering the gear ratio of a differential gear mechanism. The rotational speed of each rotating element is taken along a vertical axis, while the rotating elements are arranged along a horizontal axis so that each distance between two rotating elements along the horizontal axis is proportional to a gear ratio between the two rotating elements, specifically so that a lever ratio as a ratio of the distance between sun gear S and planet-pinion carrier PC to the distance between planet-pinion carrier PC and ring gear R is 1:λ where the ratio of the number of teeth of sun gear S and ring gear R is 1:λ. In such a lever diagram, a simple planetary gear is expressed by a straight line.

The following describes a control system of the hybrid electric vehicle of the first embodiment. As shown in FIG. 1, the control system of the hybrid electric vehicle includes an engine controller 1, a motor generator controller 2, a power control unit 3, a rechargeable battery or secondary battery 4, a brake controller 5, and an integrated controller 6.

Integrated controller 6 is configured to receive data signals from an accelerator opening sensor 7, a vehicle speed sensor 8, an engine speed sensor 9, a first motor generator speed sensor 10, and a second motor generator speed sensor 11.

Brake controller 5 is configured to receive data signals from a front left wheel speed sensor 12, a front right wheel speed sensor 13, a rear left wheel speed sensor 14, a rear right wheel speed sensor 15, a steering angle sensor 16, a master cylinder pressure sensor 17, a brake pedal stroke sensor 18, a yaw rate sensor 27, and a lateral acceleration sensor 28. The above sensors serve as means for detecting the driving condition of the vehicle.

Engine controller 1 is configured to receive a control signal indicative of a desired engine torque Te from integrated controller 6, and to output a command to a throttle valve actuator not shown to control an engine operating point (Ne, Te) of engine E, where Ne represents engine speed. Desired engine torque Te is determined by integrated controller 6 in accordance with accelerator opening AP from accelerator opening sensor 7 and engine speed Ne from engine speed sensor 9.

Motor generator controller 2 is configured to receive a control signal indicative of desired motor generator torques T1, T2 from integrated controller 6, and to output a command to power control unit 3 for controlling an operating point (N1, T1) of first motor generator MG1, and a command to power control unit 3 for controlling an operating point (N2, T2) of second motor generator MG2, where N1 and N2 represent the rotation speeds of first motor generator MG1 and second motor generator MG2, respectively. The operating points of first motor generator MG1 and second motor generator MG2 are each independently controlled. Rotational speeds N1 and N2 are input to integrated controller 6 from first motor generator speed sensor 10 and second motor generator speed sensor 11 each including a resolver. Motor generator controller 2 is configured to receive a data signal indicative of the state-of-charge (SOC) of battery 4.

Power control unit 3 includes a joint box not shown, a boost converter not shown, an inverter for electric motor, and an inverter for electric generator. Thus, power control unit 3 is constructed to be a high-voltage power supply system for supplying electric power to first motor generator MG1 and second motor generator MG2 in the form of a smaller current, minimizing the power loss. The inverter for electric motor is connected to the stator coil of second motor generator MG2, and the inverter for electric generator is connected to the stator coil of first motor generator MG1. The joint box is connected to battery 4, where electric energy is discharged at acceleration and is charged at regeneration.

Brake controller 5 is configured to perform an ABS (Antilock Brake System) control by issuing a control command to a brake fluid pressure control unit 19 for independently controlling the brake fluid pressures of four road wheels during braking on low μ roads or slippery roads, or during rapid braking. When a slowdown demand or slowdown request is produced by depressing the brake pedal or by releasing the accelerator pedal, and a desired braking force is too large to cover only by regenerative braking, brake controller 5 performs a hydraulic-regenerative cooperative braking control by issuing a control command to integrated controller 6 and brake fluid pressure control unit 19 to compensate the shortage of braking force with non-regenerative braking such as hydraulic braking. Brake controller 5 is configured to receive data signals indicative of wheel speed from wheel speed sensors 12, 13, 14, and 15, a data signal indicative of steering angle from steering angle sensor 16, a data signal indicative of the manipulated amount of braking operation from master cylinder pressure sensor 17 and brake pedal stroke sensor 18, a data signal indicative of yaw rate from yaw rate sensor 27, a data signal indicative of lateral acceleration from lateral acceleration sensor 28. Brake controller 5 is configured to perform a predetermined operation of processings based on the above input data to determine a control command, and configured to output the control command to integrated controller 6 and brake fluid pressure unit 19. Brake fluid pressure control unit 19 is connected hydraulically to a front left wheel cylinder 20, a front right wheel cylinder 21, a rear left wheel cylinder 22, and a rear right wheel cylinder 23. The components 19 through 23 serve as a non-regenerative braking unit arranged to produce a non-regenerative braking effort for the vehicle. The components 2, 3, 4, MG1, MG2, TM, OS, CB serve as a regenerative braking unit arranged to produce a regenerative braking effort for the vehicle.

Integrated controller 6 serves for managing the whole consumption energy of the vehicle, and driving the vehicle with optimum efficiency. Integrated controller 6 is configured to issue a control command to engine controller 1 to control the engine operating point at acceleration, and to issue a control command to motor generator controller 2 to control the motor generator operating point at rest, at running, and at braking. Integrated controller 6 is configured to receive an accelerator opening AP, a vehicle speed VSP, an engine speed Ne, a first motor generator speed N1, and a second motor generator speed N2, from sensors 7, 8, 9, 10, and 11, respectively. Integrated controller 6 is configured to perform a predetermined operation of processings based on the above input data to determine a control command, and configured to output the control command to engine controller 1 and motor generator controller 2. Integrated controller 6 is connected for data exchange to engine controller 1, motor generator controller 2, and brake controller 5, via bidirectional communication cables 24, 25, and 26, respectively.

The following describes the driving performance of the hybrid electric vehicle of the first embodiment. FIGS. 2A and 2B are views showing the driving performance of the hybrid electric vehicle of FIG. 1. As shown in FIG. 2B, the driving force of the hybrid electric vehicle is a sum total of an engine direct driving force or driving force produced by subtracting a driving force for electric power generation from the engine gross driving force, and a motor driving force or driving force produced by totalizing both motor generators MG1 and MG2. As shown in FIG. 2A, the proportion of the capacity of the electric motor driving force to the capacity of the total driving force increases with decrease in the vehicle speed. Thus, the hybrid electric vehicle of this embodiment is driven by the engine direct driving force from engine E and the electric motor driving force produced by electric conversion, with no transmission mechanism. Accordingly, the driving force is controllable according to driver's demand with a sufficient response seamlessly from low speed to high speed, and from steady-state driving conditions where the driving power is low to conditions where the driving power is maximum at full-throttle acceleration, providing so called "torque on demand." In the hybrid electric vehicle of the first embodiment, engine E, motor generators MG1 and MG2, and the right and left front wheels are connected via power split mechanism TM with no clutch. In addition, as mentioned above, the great portion of the engine power is converted into electric energy by one motor generator, while the vehicle is driven by the other motor generator of high output and high response. Accordingly, the hybrid electric vehicle includes a system to prevent power control unit 3 from superfluous current and to prevent the pinions of power split mechanism TM from excessively high rotation in case the driving force of the vehicle is rapidly changed by tire slip, or tire lock at braking, etc. while the vehicle is running on slippery roads such as icy roads. Specifically, taking advantage of the high output and high response characteristic of electric motor, the hybrid electric vehicle includes a motor traction control system for immediately detecting tire slip, and recovering tire grip, in order to protect power control unit 3 or power split mechanism TM, and additionally to drive the vehicle safely.

Figure 3A:
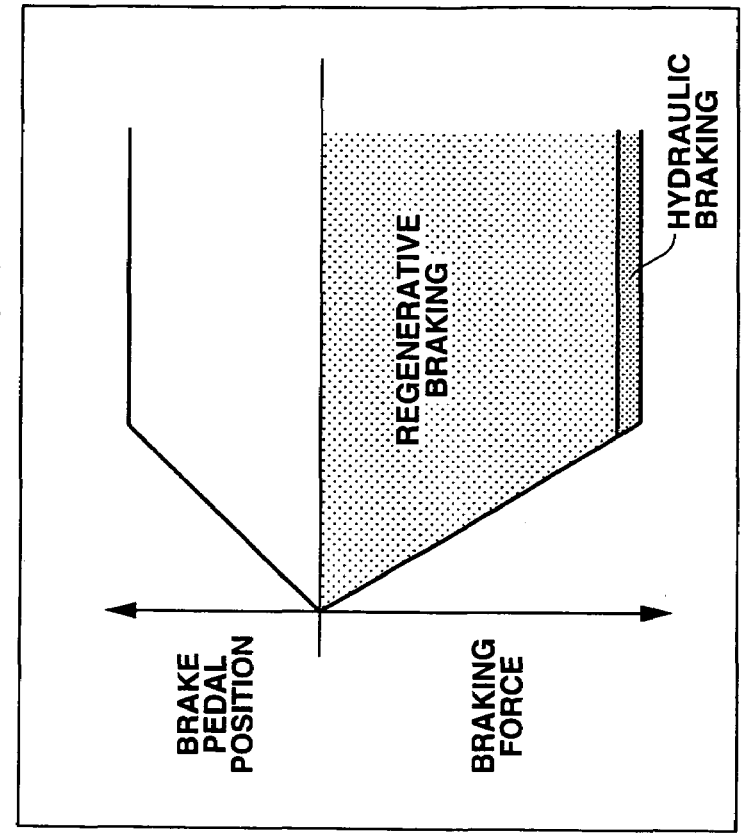
FIGS. 3A and 3B are views showing a reference characteristic of hydraulic-regenerative cooperative braking and a characteristic of hydraulic-regenerative cooperative braking of the hybrid electric vehicle of FIG. 1.
Figure 3B:
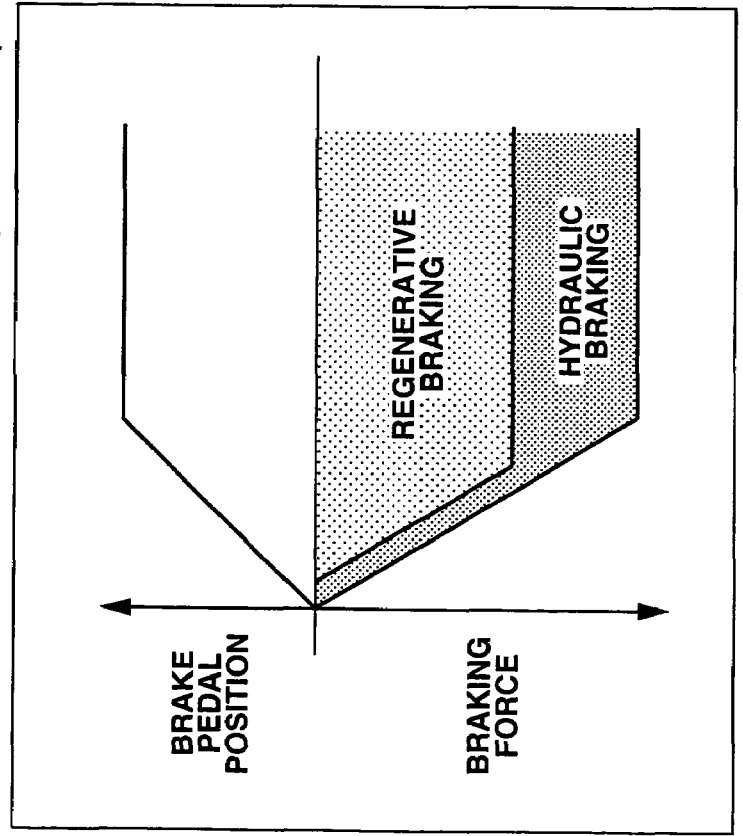

The following describes the braking performance of the hybrid electric vehicle of the first embodiment. FIGS. 3A and 3B are views showing a reference characteristic of hydraulic-regenerative cooperative braking and a characteristic of hydraulic-regenerative cooperative braking of the hybrid electric vehicle of FIG. 1. The hybrid electric vehicle of the first embodiment includes a regenerative braking system configured to operate second motor generator MG2 as a generator in response to the slowdown request produced by depressing the brake pedal, or releasing the accelerator pedal, to convert the kinetic energy of the vehicle into electric energy, to collect the converted electric energy in battery 4, and to reuse the collected electric energy. FIG. 3A shows a reference characteristic of hydraulic-regenerative cooperative braking control, wherein a desired braking force is computed according to the amount of depression of a brake pedal, and wherein the desired braking force is constantly shared between regenerative braking and hydraulic braking. On the other hand, FIG. 3B shows the characteristic of hydraulic-regenerative cooperative braking of the hybrid electric vehicle of the first embodiment, wherein a desired braking force is computed according to the amount of depression of a brake pedal, and wherein the regenerative braking is given with a high priority to produce the desired braking force. As long as the desired braking force is covered only by the regenerative braking, the hydraulic braking is not involved. Thus, the region is maximally expanded where only the regenerative braking is involved without the hydraulic braking, as shown in FIG. 3B. As a result, electric energy is recovered at lower speeds, so that energy recovery efficiency is high especially in running patterns including frequent acceleration and deceleration.

Figure 4A:
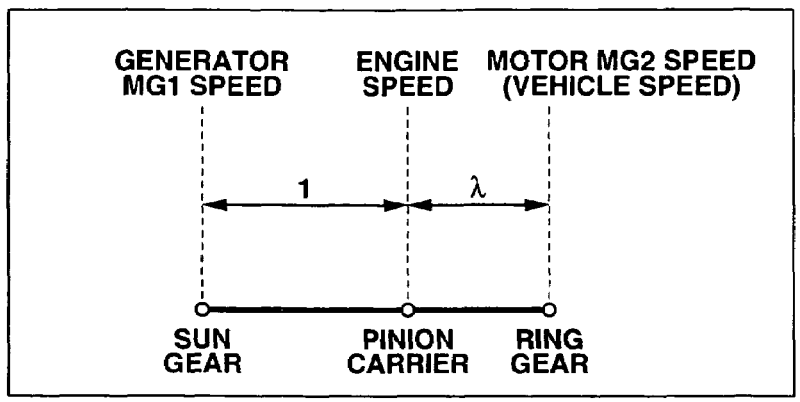
FIGS. 4A through 4E are lever diagrams showing operating modes of the hybrid electric vehicle of FIG. 1.
Figure 4B:
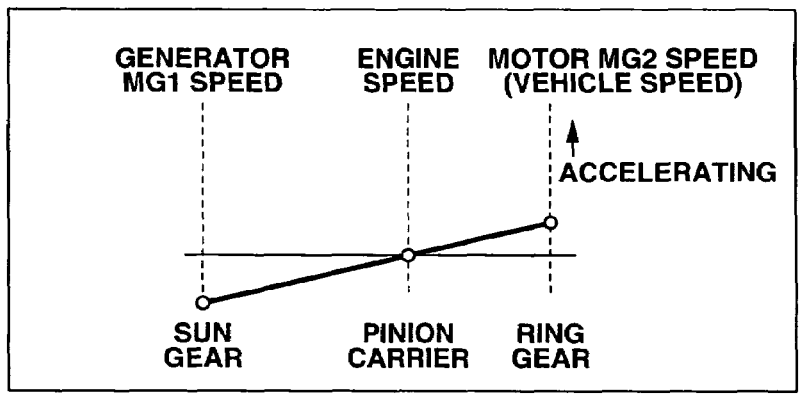
Figure 4C:
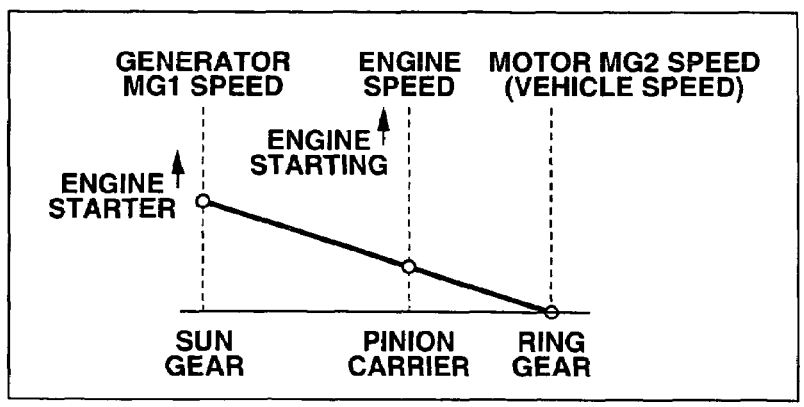
Figure 4D:
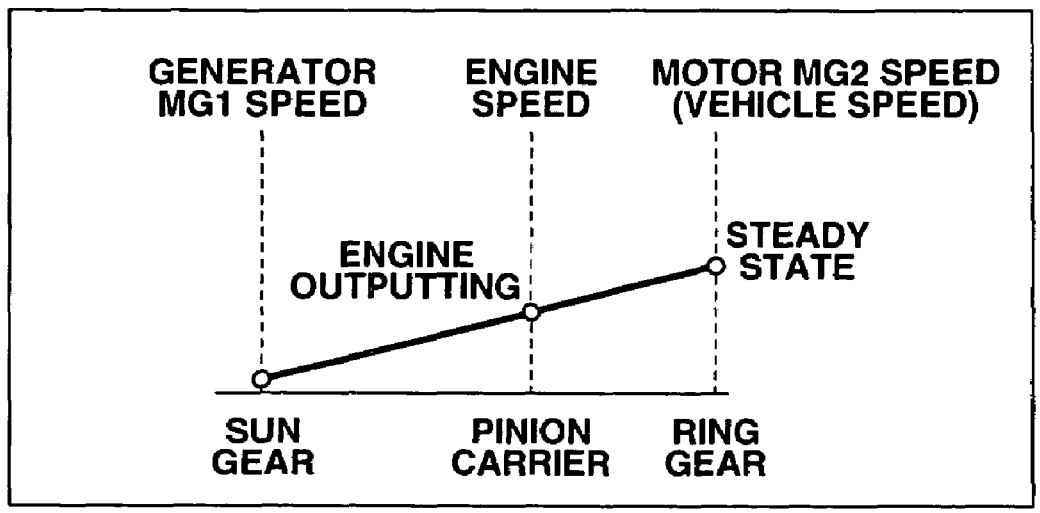
Figure 4E:
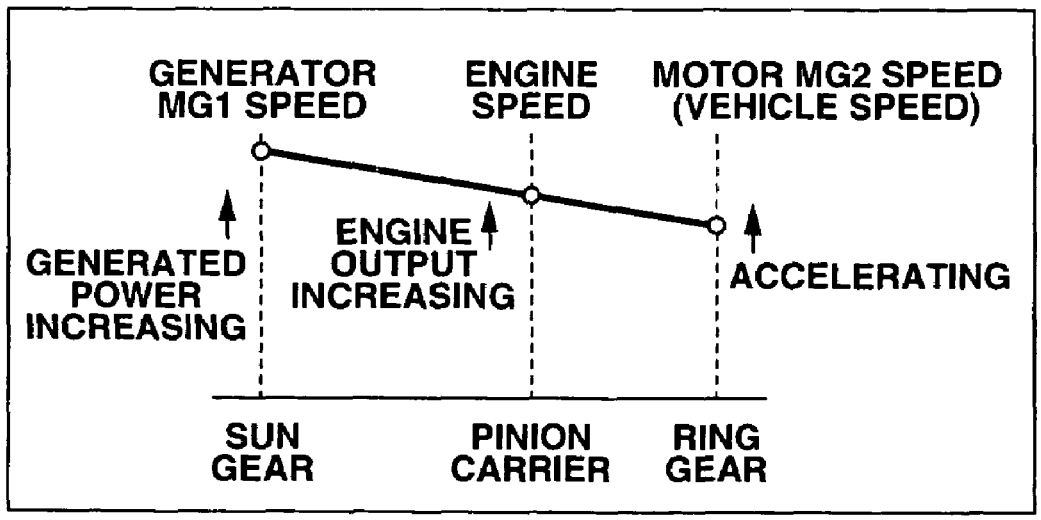

The following describes operating modes of the hybrid electric vehicle of the first embodiment. FIGS. 4A through 4E are lever diagrams showing operating modes of the hybrid electric vehicle of FIG. 1. As shown in FIGS. 4A through 4E, the operating modes includes "stop mode," "vehicle start mode," "engine start mode," "steady-state driving mode," and "acceleration mode." As shown in FIG. 4A, engine E, first motor generator MG1, and second motor generator MG2 are at rest in the stop mode. As shown in FIG. 4B, the vehicle is driven only by second motor generator MG2 in the vehicle start mode. As shown in FIG. 4C, sun gear S of power split mechanism TM is rotated by first motor generator MG1 with a function of an engine starter, to start engine E in the engine start mode. As shown in FIG. 4D, the vehicle is driven mainly by engine E with minimum required electric power generation in order to raise power efficiency in the steady-state driving mode. As shown in FIG. 4E, the vehicle is accelerated by increasing the rotational speed of engine E, by starting electric power generation with first motor generator MG1, and by increasing the driving force of second motor generator MG2 using the generated electric power and electric power of battery 4 in the acceleration mode. Backward driving is implemented by holding the rotational speed of engine E and increasing the rotational speed of first motor generator MG1 in the steady-state driving mode shown in FIG. 4D, so that the rotational speed of second motor generator MG2 shifts to the negative side.

During engine start, engine E is started by turning an ignition key, and then is stopped immediately after engine E is warmed up. During vehicle start or during low load conditions where the vehicle is descending a mild hill at a considerably low speed, the vehicle is driven by second motor generator MG2, with cutting fuel to stop engine E in a region where engine efficiency is low. During normal driving, the driving effort of engine E is split by power split mechanism TM to directly drive the right and left front wheels, and to drive first motor generator MG1 to assist second motor generator MG2. During full throttle acceleration, electric power is supplied from battery 4 to further drive second motor generator MG2. While a slowdown request is present, second motor generator MG2 is driven by the left and right front wheels, so that second motor generator MG2 performs electric power generation as a generator. The collected electric energy is stored in battery 4. When the charged electric power in battery 4 decreases, first motor generator MG1 starts to be driven by engine E to charge battery 4 with electric energy. While the vehicle is standstill, engine E is automatically stopped except in case the air conditioner is in use or in case battery 4 is being charged.

The following describes the detailed configuration of the regenerative braking control apparatus of the first embodiment. FIG. 5 is a block diagram showing a process of regenerative braking control in accordance with the first embodiment. The control process is embedded as a control program in brake controller 5. As shown in FIG. 5, the regenerative braking control apparatus of the first embodiment includes a desired regenerative braking torque processing module 30, a regenerative braking torque limit computing section 31, and a final output regenerative braking torque processing module 32.

Desired regenerative braking torque processing module 30 is configured to receive redundant data of the master cylinder pressure, i.e. a first master cylinder pressure value MCP1 as a primary value, a second master cylinder pressure value MCP2 as a secondary value, and redundant data of the brake pedal stroke, i.e. a first brake pedal stroke value STROKE1 as a primary value, a second brake pedal stroke value STROKE2 as a secondary value, and configured to compute a desired regenerative braking torque REGE based on the above input data.

Regenerative braking torque limit computing section 31 is configured to receive a front left wheel speed VWFL, a front right wheel speed VWFR, a rear left wheel speed VWRL, a rear right wheel speed VWRR, and a steering angle STR, and configured to compute a regenerative braking torque upper limit REGELIM in accordance with an estimated amount or level or degree of understeer of the vehicle when braking operation is performed while cornering, or in so-called cornering braking.

Final output regenerative braking torque processing module 32 is configured to receive desired regenerative braking torque REGE and regenerative braking torque upper limit REGELIM, configured to select the lower one of desired regenerative braking torque REGE and regenerative braking torque upper limit REGELIM as a limited regenerative braking torque REGEMIN by way of a so-called select-LOW process, configured to compute a final output regenerative braking torque TXREGE by filtering limited regenerative braking torque REGEMIN with an upper limit and a lower limit, and configured to output final output regenerative braking torque TXREGE to integrated controller 6.

As shown in FIG. 6, regenerative braking torque limit computing section 31 includes a front wheel speed deviation processing module 311, a vehicle speed processing module 312, and a regenerative braking torque upper limit processing module 314.

Figure 7:
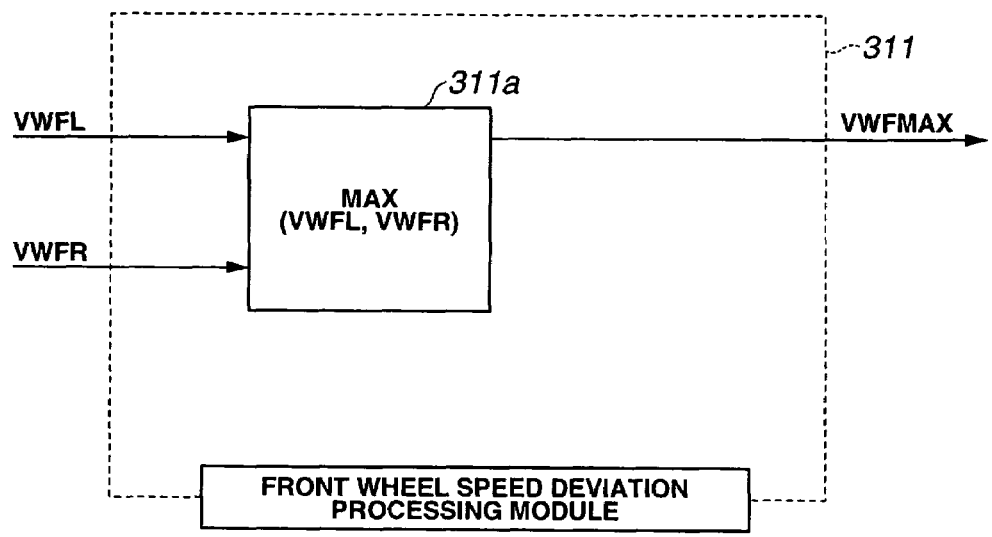
FIG. 7 is a block diagram showing a front wheel speed deviation processing module 311 in regenerative braking torque limit computing section 31 of FIG. 6.

As shown in FIG. 7, front wheel speed deviation processing module 311 is configured to compute a front outside wheel speed VWFMAX used to compute the estimated amount of understeer, receiving sensor signals indicative of front left wheel speed VWFL and front right wheel speed VWFR. Front wheel speed deviation processing module 311 is configured to select the higher one (front outside wheel speed) of front left wheel speed VWFL and front right wheel speed VWFR, as front outside wheel speed VWFMAX.

Figure 8:
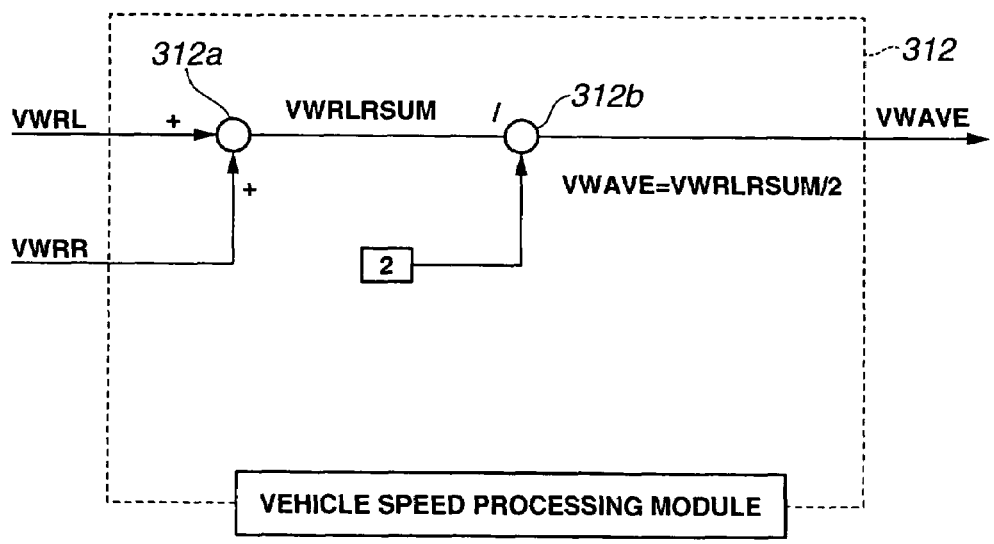
FIG. 8 is a block diagram showing a vehicle speed processing module 312 in regenerative braking torque limit computing section 31 of FIG. 6.

As shown in FIG. 8, vehicle speed processing module 312 is configured to compute an average of left and right rear wheel speeds as a non-regenerative-braking-applied wheel speed or non-motor-generator-driven wheel speed or estimated vehicle speed used to compute the estimated amount of understeer, receiving sensor signals indicative of rear left wheel speed VWRL and rear right wheel speed VWRR. Vehicle speed processing module 312 includes an adder 312*a* for adding rear left wheel speed VWRL and rear right wheel speed VWRR to produce a rear wheel speed sum VWRLRSUM, and a divider 312*b* for dividing rear wheel speed sum VWRLRSUM by two to produce a rear average wheel speed VWAVE.

Figure 9:
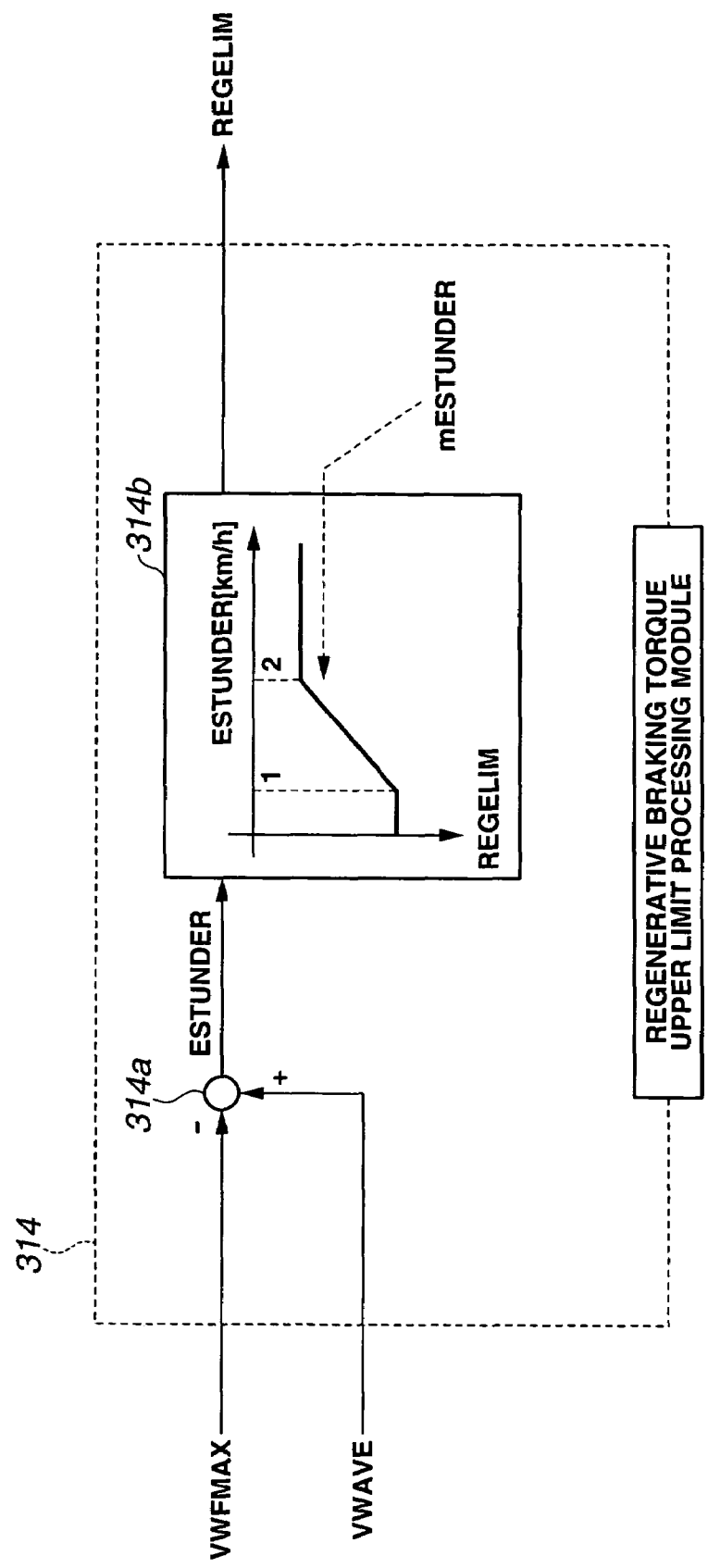
FIG. 9 is a block diagram showing a regenerative braking torque upper limit processing module 314 in regenerative braking torque limit computing section 31 of FIG. 6.

As shown in FIG. 9, regenerative braking torque upper limit processing module 314 is configured to receive front outside wheel speed VWFMAX and rear average wheel speed VWAVE, and configured to compute a regenerative braking torque upper limit REGELIM based on the difference between front outside wheel speed VWFMAX and rear average wheel speed VWAVE. Regenerative braking torque upper limit processing module 314 includes a subtracter 314*a* for subtracting front outside wheel speed VWFMAX from rear average wheel speed VWAVE to produce a wheel speed deviation (or front-rear wheel speed difference or wheel speed longitudinal deviation) ESTUNDER, and a regenerative braking torque upper limit determination part 314*b* including a regenerative braking torque upper limit lookup table mESTUNDER for determining regenerative braking torque upper limit REGELIM based on wheel speed deviation ESTUNDER. Wheel speed deviation ESTUNDER is regarded as the estimated amount of understeer. Regenerative braking torque upper limit lookup table mESTUNDER is adjusted basically for each vehicle or for each tire.

Figure 10:
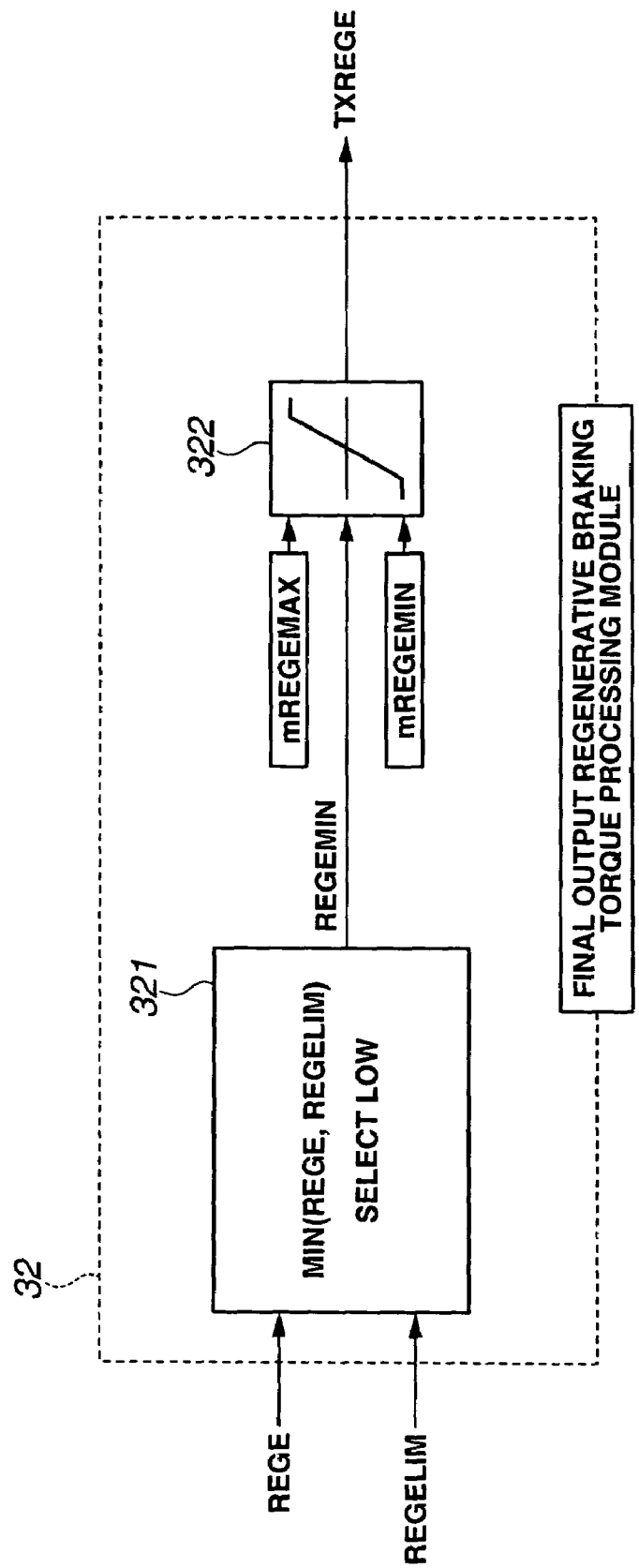
FIG. 10 is a block diagram showing a final output regenerative braking torque processing module 32 in the control process of FIG. 5.

As shown in FIG. 10, final output regenerative braking torque processing module 32 is configured to receive desired regenerative braking torque REGE from desired regenerative braking torque processing module 30, and regenerative braking torque upper limit REGELIM from regenerative braking torque limit computing section 31. Final output regenerative braking torque processing module 32 includes a select-LOW module 321 for selecting the lower one of desired regenerative braking torque REGE and regenerative braking torque upper limit REGELIM as a limited regenerative braking torque REGEMIN by way of a so-called select-LOW process, and a final output regenerative braking torque computing module 322 for computing final output regenerative braking torque TXREGE by filtering limited regenerative braking torque REGEMIN with regenerative braking torque upper limit mREGEMAX and regenerative braking torque lower limit mREGEMIN.

Figure 11:
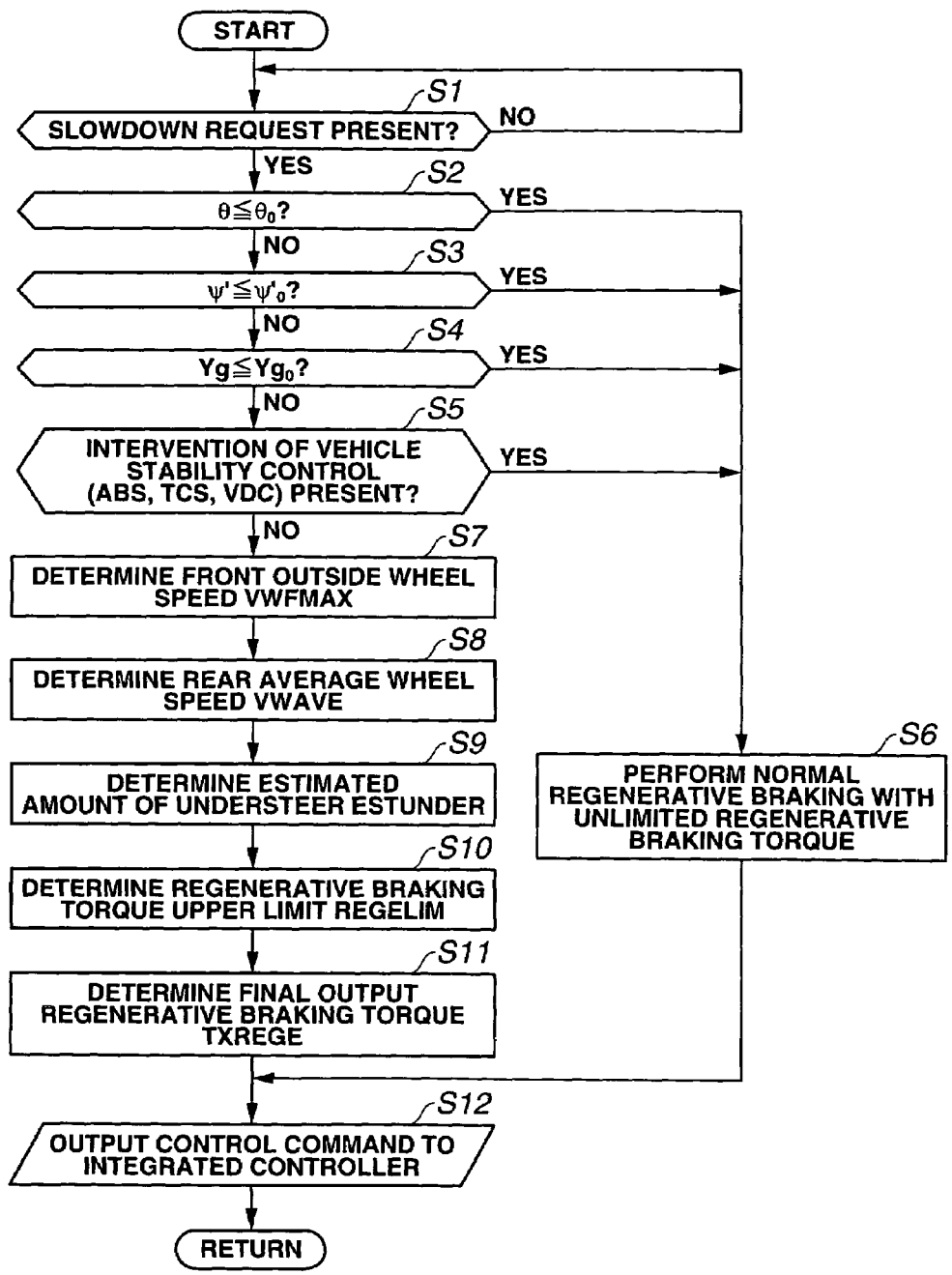
FIG. 11 is a flow chart showing a process of regenerative braking control performed by a brake controller 5 in accordance with the first embodiment.

The following describes operations of the regenerative braking control apparatus of the first embodiment. FIG. 11 is a flow chart showing a process of regenerative braking control performed by brake controller 5 in accordance with the first embodiment.

At step S1, brake controller 5 determines whether or not a slowdown request is present by depressing the brake pedal or by releasing the accelerator pedal. When the answer to step S1 is affirmative (YES), the routine proceeds to step S2. On the other hand, when the answer to step S1 is negative (NO), the operation of determination at step S1 is repeated.

At step S2, brake controller 5 determines whether or not steering angle θ determined based on the sensor signal from steering angle sensor 16 is smaller than or equal to a straight driving judgment threshold $\theta_0$. When the answer to step S2 is YES, the routine proceeds to step S6. On the other hand, when the answer to step S2 is NO, the routine proceeds to step S3.

At step S3, brake controller 5 determines whether or not yaw rate ψ' determined based on the sensor signal from yaw rate sensor 27 is smaller than or equal to a straight driving judgment threshold $\psi'_0$. When the answer to step S3 is YES, the routine proceeds to step S6. On the other hand, when the answer to step S3 is NO, the routine proceeds to step S4.

At step S4, brake controller 5 determines whether or not lateral acceleration Yg determined based on the sensor signal from lateral acceleration sensor 28 is smaller than or equal to a straight driving judgment threshold $Yg_0$. When the answer to step S4 is YES, the routine proceeds to step S6. On the other hand, when the answer to step S4 is NO, the routine proceeds to step S5.

At step S5, brake controller 5 determines whether or not an interrupt or intervention of vehicle stability control is present, such as ABS, TCS (Traction Control System), and VDC (Vehicle Dynamics Control). When the answer to step S5 is YES, the routine proceeds to step S6. On the other hand, when the answer to step S5 is NO, the routine proceeds to step S7.

At step S6, brake controller 5 performs normal regenerative braking with unlimited regenerative braking torque, following the determination in steps S2, S3, or S4 that the vehicle is traveling straight, or following the determination in step S5 that an intervention of vehicle behavior control is present. Subsequent to step S6, the routine proceeds to step S12.

At step S7, brake controller 5 computes front outside wheel speed VWFMAX as the outside wheel speed of the regenerative-braking-applied wheels (or motor-generator-driven wheels or front wheels). Subsequent to step S7, the routine proceeds to step S8.

At step S8, brake controller 5 computes rear average wheel speed VWAVE. Subsequent to step S8, the routine proceeds to step S9.

At step S9, brake controller 5 computes wheel speed deviation or estimated amount of understeer ESTUNDER as the difference between rear average wheel speed VWAVE and front outside wheel speed VWFMAX. Subsequent to step S9, the routine proceeds to step S10.

Figure 12:
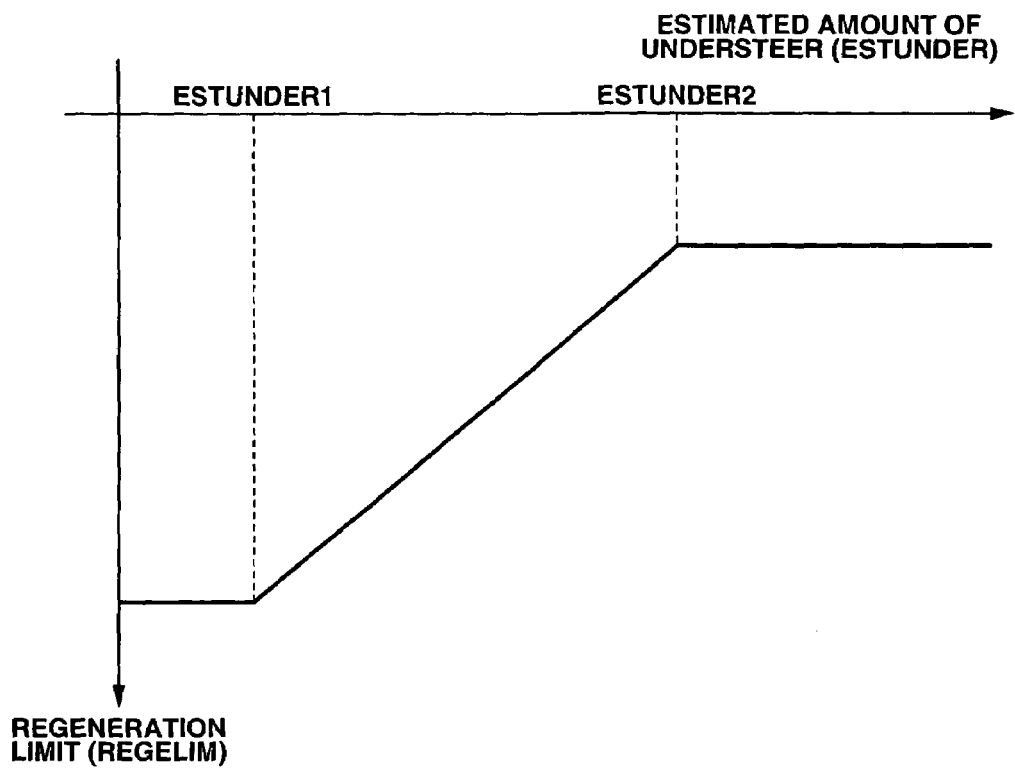
FIG. 12 is a graph showing a lookup table for determining a regenerative braking torque upper limit REGELIM in the process of regenerative braking control in the first embodiment.
Figure 13:
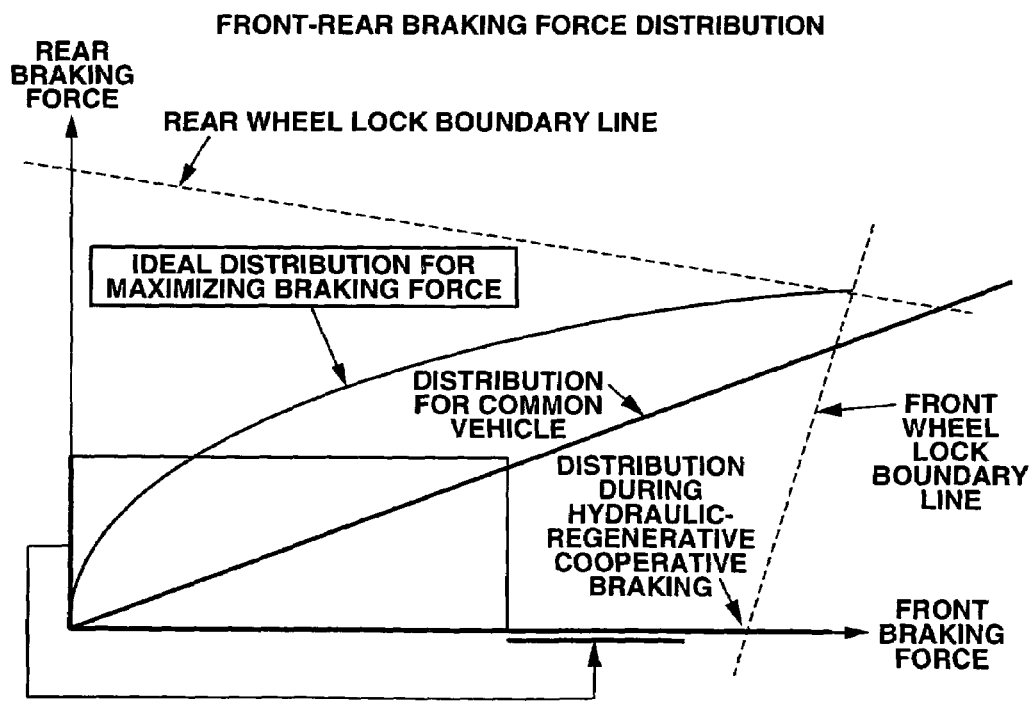
FIG. 13 is a graph showing a characteristic of front-rear braking force distribution at hydraulic-regenerative cooperative braking.
Figure 14:
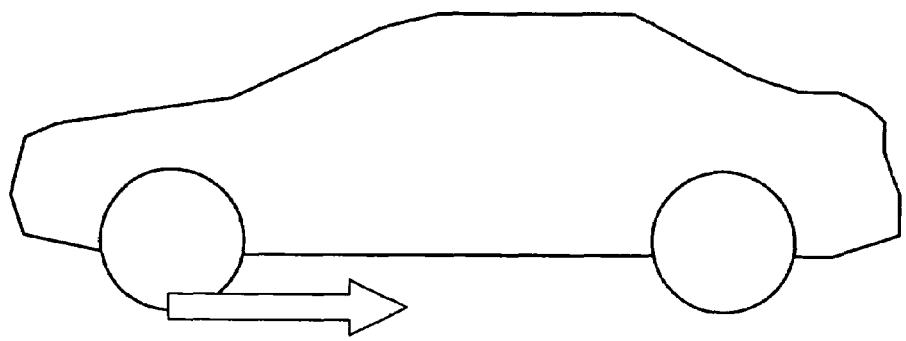
FIG. 14 is a view showing a condition where a front engine front-wheel drive vehicle is applied with a hydraulic-regenerative cooperative braking for 0.2 G.

At step S10, brake controller 5 computes regenerative braking torque upper limit REGELIM based on wheel speed deviation ESTUNDER and regenerative braking torque upper limit lookup table mESTUNDER. Subsequent to step S10, the routine proceeds to step S11. As shown in FIG. 12, regenerative braking torque upper limit lookup table mESTUNDER is set so that regenerative braking torque upper limit REGELIM is a constant value or system limit value as wheel speed deviation ESTUNDER is below a first set value ESTUNDER1, so that regenerative braking torque upper limit REGELIM linearly decreases with increase in wheel speed deviation ESTUNDER as wheel speed deviation ESTUNDER is between first set value ESTUNDER1 and a second set value ESTUNDER2, and so that regenerative braking torque upper limit REGELIM is a constant value or icy road limit value as wheel speed deviation ESTUNDER is above second set value ESTUNDER2.

At step S11, brake controller 5 receives desired regenerative braking torque REGE from desired regenerative braking torque processing module 30, and regenerative braking torque upper limit REGELIM from regenerative braking torque limit computing section 31, selects the lower one of desired regenerative braking torque REGE and regenerative braking torque upper limit REGELIM as limited regenerative braking torque REGEMIN by way of the select-LOW process, and computes final output regenerative braking torque TXREGE by filtering limited regenerative braking torque REGEMIN with regenerative braking torque upper limit mREGEMAX and regenerative braking torque lower limit mREGEMIN. Subsequent to step S11, the routine proceeds to step S12.

At step S12, brake controller 5 outputs a control command to integrated controller 6 to control the generative braking torque in accordance with desired regenerative braking torque REGE from step S6 or final output regenerative braking torque TXREGE from step S11. When the maximum regenerative braking force is short with respect to the desired braking force, brake controller 5 also outputs a control command to brake fluid pressure control unit 19 to compensate the shortage of braking force with hydraulic braking. Subsequent to step S12, the routine returns.

The following describes the vehicle behavior in cornering braking. In general, when regenerative braking is applied only to left and right front wheels without limiting the regenerative braking force and without applying hydraulic braking during cornering braking, the vehicle shows an understeer tendency especially on a low friction coefficient road. This behavior is produced as follows. In common vehicles equipped with no proportioning valve and with no EBD (Electronic Brake-force Distribution) system, the front-rear braking force distribution is implemented by a characteristic represented by a straight line in FIG. 13 that is approximated to the ideal distribution line for theoretically optimizing the overall braking force. However, if the front-rear braking force distribution is set to the ideal braking force distribution in a front-wheel drive hybrid electric vehicle, it is necessary to perform hydraulic braking at the left and right rear wheels that are not connected to a generator. Therefore, the regeneration of electric power is reduced by the portion of hydraulic braking, so that the amount of energy recovery decreases to adversely affect the fuel economy of the vehicle. On the other hand, in the hybrid electric vehicle of the first embodiment, the desired braking force is provided only with the regenerative braking force unless the desired braking force is too large for the regenerative braking force to cover, as shown in FIG.

Figure 15:
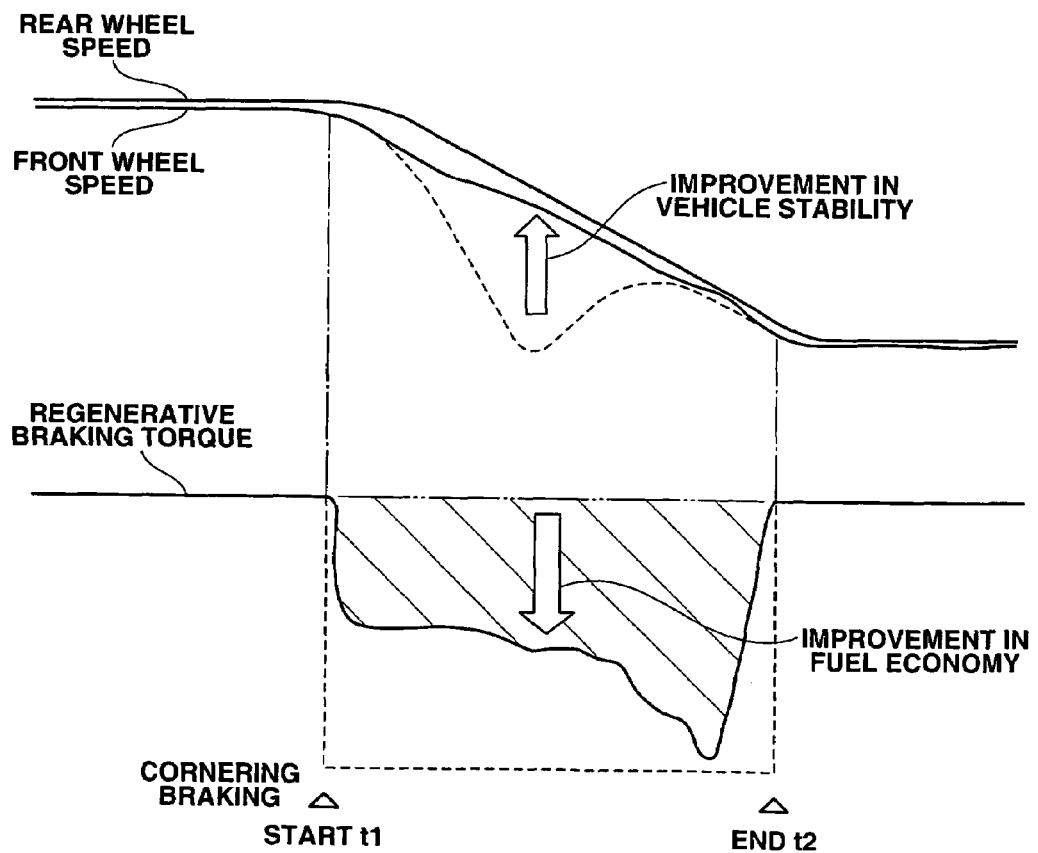
FIG. 15 is a view showing how a front wheel speed, a rear wheel speed, and a regenerative braking torque change in the regenerative braking control in the first embodiment.

14. That is, the regenerative braking at the front wheels is prioritized to raise the fuel economy of the vehicle. In FIG. 15, the braking force distribution to the left and right rear wheels is held at zero, while as indicated by an arrow, the front wheel braking force covers a part of the rear wheel braking force of common vehicles so that the front wheel braking force approaches a front wheel lock boundary line. As a result, when the front wheel braking force based on regenerative braking increases excessively to approach the front wheel lock boundary line in cornering braking, the lateral force capacity of the left and right front wheels is reduced so that the vehicle shows an understeer characteristic with which the vehicle travels along a curve outside from a curve intended by the front steering angle. This understeer characteristic is positively strengthened as the front wheel braking force approaches the front wheel lock boundary line.

The following describes effects produced by the restriction of regenerative braking torque in cornering braking in accordance with the first embodiment. In contrast to the above-mentioned braking control, the regenerative braking control apparatus of the hybrid electric vehicle of the first embodiment wherein the restriction of regenerative braking torque is strengthened with increase in wheel speed deviation ESTUNDER between rear average wheel speed VWAVE and front outside wheel speed VWFMAX, is effective for achieving a high level of compatibility of the actual fuel economy of the vehicle and the cornering behavior stability of the vehicle. Specifically, in cornering braking without intervention of vehicle behavior controls, the control process proceeds in the flow chart of FIG. 11, in order of steps S1, S2, S3, S4, S5, S7, S8, S9, S10, S11, and S12. At step S9, wheel speed deviation or estimated amount of understeer ESTUNDER is computed as the difference between rear average wheel speed VWAVE and front outside wheel speed VWFMAX. At step S10, regenerative braking torque upper limit REGELIM is computed based on wheel speed deviation ESTUNDER and regenerative braking torque upper limit lookup table mESTUNDER as shown in FIG. 12. At step 511, limited regenerative braking torque REGEMIN is selected by the select-LOW process, and final output regenerative braking torque TXREGE is computed by filtering. At step S12, final output regenerative braking torque TXREGE is output to integrated controller 6.

The following describes a logic of estimating the vehicle behavior where wheel speed deviation ESTUNDER is used as an indicator of the amount of understeer. When a front-wheel drive vehicle shows a strong understeer tendency in cornering braking, the difference in wheel speed between left and right front wheels is near zero, and the difference in wheel speed between left and right rear wheels is also near zero. On the other hand, the front wheel speed decreases as the friction circle of the front tires is allocated largely to the regenerative braking so that the front tires approach a lock state, while the rear wheel speed keeps to follow the vehicle speed. Accordingly, wheel speed deviation ESTUNDER between the front wheel speed and the rear wheel speed increases. Incidentally, wheel speed deviation ESTUNDER increases also when the vehicle performs braking to approach a wheel lock state while traveling straight. On the other hand, when a front-wheel drive vehicle shows little understeer tendency in cornering braking, the difference in wheel speed between left and right front wheels is a constant value determined by the difference in the turning radius between left and right. The front wheels have a margin to the tire friction circle so that the fall of wheel speed is mild, wheel speed deviation ESTUNDER between the front wheel speed and the rear wheel speed is small. Thus, wheel speed deviation ESTUNDER determined based on the data from wheel speed sensors 12, 13, 14, and 15 on the vehicle may be considered as an estimated amount of understeer in cornering braking. In other words, wheel speed deviation ESTUNDER serves as an undesirability indicator indicative of a degree of undesirability of cornering behavior of a vehicle under influence of a regenerative braking effort. The undesirability indicator may be defined to tend to increase with increase in the regenerative braking effort. The undesirability indicator may be defined as a deviation from a desired steer characteristic of the vehicle.

Based on the above-mentioned logic, the regenerative braking control of the first embodiment is configured to strengthen the limitation to the regenerative braking with increase in the estimated amount of understeer in cornering braking, resulting in dampening the understeer tendency to stabilize the vehicle cornering behavior, and resulting in singly performing regenerative braking at the front wheels to enhance the actual vehicle fuel economy. FIG. 15 is a view showing how a front wheel speed, a rear wheel speed, and a regenerative braking torque change in the regenerative braking control in the first embodiment. In the situation of FIG. 15, the cornering braking starts at time t1 and terminates at time t2. When the regenerative braking is controlled to be maximum from time t1 to time t2 as a characteristic of regenerative braking torque indicated by the dotted line in FIG. 15, the actual vehicle fuel economy is the highest, but the front wheel speed falls to show an understeer tendency as a characteristic of the front wheel speed indicated by the dotted line. However, in case the regenerative braking is permitted only in straight-driving braking and is inhibited in cornering braking where the hydraulic braking is employed based on the ideal distribution, the understeer tendency is dampened but the actual vehicle fuel economy is adversely affected. On the other hand, the fall in the front wheel speed is dampened by applying restriction to the regenerative braking, to dampen an understeer tendency, and to stabilize the vehicle cornering behavior as the characteristic of front wheel speed indicated by the solid line in FIG. 15. In parallel, the system where the front regenerative braking is prioritized also in cornering braking is effective for raising the actual vehicle fuel economy higher than in the case where regenerative braking is inhibited in cornering braking as shown by "IMPROVEMENT IN FUEL ECONOMY" in FIG. 15.

The regenerative braking control apparatus and method of the first embodiment produce the following effects and advantages (1) through (6).

(1) A regenerative braking control apparatus for a wheeled vehicle, including: a regenerative braking unit (2, 3, 4, MG1, MG2, TM, OS, CB) arranged to produce a regenerative braking effort for the vehicle; and a control unit (5, 6) connected for signal communication to the regenerative braking unit (2, 3, 4, MG1, MG2, TM, OS, CB), and configured to perform the following: measuring a wheel speed deviation (ESTUNDER) defined as a difference between a speed of a front wheel set of the vehicle and a speed of a rear wheel set of the vehicle; and controlling the regenerative braking effort in accordance with the wheel speed deviation (ESTUNDER) during cornering, wherein the control unit (5, 6) is configured to control the regenerative braking effort to decrease with an increase in the wheel speed deviation (ESTUNDER) during cornering braking, and wherein the control unit (5, 6) is configured to perform braking for the vehicle in accordance with an operation of slowdown request, prioritizing a regenerative braking effort for one of the front wheel set and the rear wheel set of the vehicle, is effective for achieving a high level of compatibility of the actual fuel economy of the vehicle and the cornering behavior stability of the vehicle.

(2) The regenerative braking control apparatus wherein the control unit (5, 6) is configured to determine the wheel speed deviation (ESTUNDER) as a difference between an average speed of a non-regenerative-braking-applied wheel set of the vehicle (VWAVE) and a speed of a regenerative-braking-applied outside wheel of the vehicle (VWFMAX) during cornering, is effective for accurately estimating a suitable indicator indicative of the vehicle behavior without overestimating the vehicle behavior. While a front-wheel drive vehicle is traveling in cornering braking, the centrifugal force is applied to the vehicle to reduce the load on the inside wheels so that the inside wheels are brought to be in a braking lock state more likely than the outer wheels. Accordingly, if front outside wheel speed VWFMAX used to compute wheel speed deviation ESTUNDER were determined as the speed of the front inside wheel or as the average of front wheel speeds, the estimated amount of understeer would be overestimated. Similarly, in case of a rear-wheel drive vehicle, an estimated amount of oversteer would be overestimated for the same reason.

(3) The regenerative braking control apparatus wherein the control unit (5, 6) is configured to perform the following: adjusting an upper limit (REGELIM) to decrease with an increase in the wheel speed deviation (ESTUNDER); and limiting the regenerative braking effort with the upper limit (REGELIM) during cornering, and wherein the control unit (5, 6) is configured to hold the upper limit (REGELIM) for the regenerative braking effort constant in a region where the wheel speed deviation (ESTUNDER) is larger than or equal to a predetermined threshold, is effective for keeping the limit value at or above a value equivalent to icy road tire-road friction coefficient to prevent malfunction of the limiting control of regenerative braking, thereby for stabilizing the operation of the limiting control of regenerative braking.

(4) The regenerative braking control apparatus wherein the control unit (5, 6) is configured to perform the following: determining whether or not the vehicle is traveling straight; and inhibiting the controlling the regenerative braking effort, when it is determined that the vehicle is traveling straight, is effective for reliably preventing malfunction of the limiting control of regenerative braking during straight-driving braking, and thereby for preventing adverse effects to the actual vehicle fuel economy.

(5) The regenerative braking control apparatus wherein the control unit (5, 6) is configured to inhibit the controlling the regenerative braking effort, when an intervention of a control for dynamic behavior of the vehicle is present, is effective for preventing control interference with vehicle stability control systems, and thereby for enhancing robustness of the integrated system. Common hybrid electric vehicles have a function to restrict regeneration while ABS system etc. is operating. In contrast, the purpose of the above inhibition of limiting the regenerative braking force is to prevent a system interference, i.e. to improve the system robustness.

(6) The regenerative braking control apparatus wherein the regenerative braking unit (2, 3, 4, MG1, MG2, TM, OS, CB) is arranged to produce the regenerative braking effort for the front wheel set, and wherein the control unit (5, 6) includes: a desired regenerative braking torque processing module (30) configured to determine a desired regenerative braking torque (REGE) in accordance with an operation of slowdown request; a regenerative braking torque limit computing section (31) configured to determine the wheel speed deviation (ESTUNDER) and to determine an upper limit (REGELIM) to decrease with an increase in the wheel speed deviation (ESTUNDER); and a final output regenerative braking torque processing module (32) configured to select a lower one of the desired regenerative braking torque (REGE) and the upper limit (REGELIM) as a setpoint of the regenerative braking effort (REGEMIN), is effective for dampening an understeer tendency, and achieving a high level of compatibility of the actual fuel economy of the vehicle and the cornering behavior stability of the vehicle.

Figure 16:
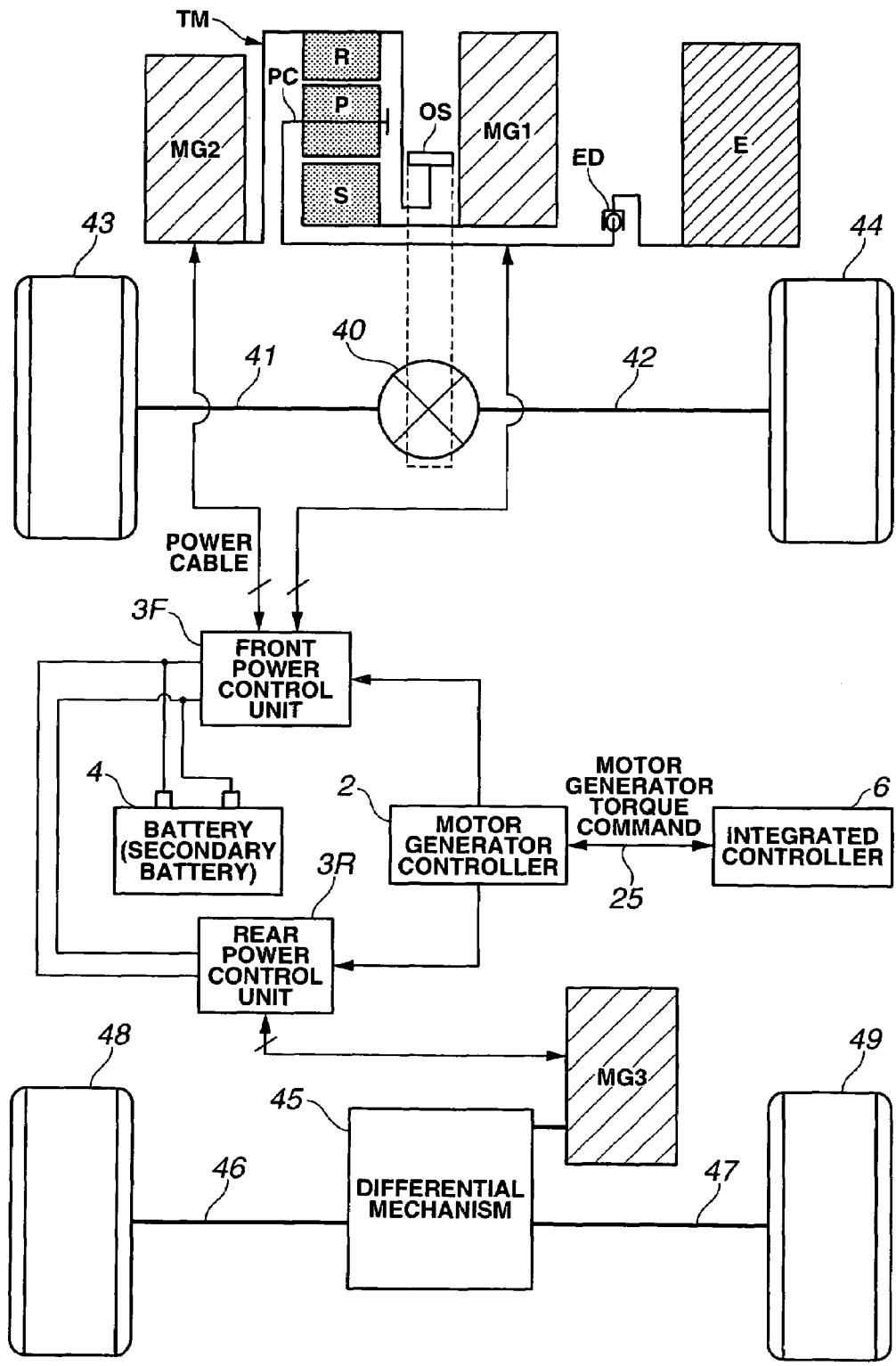
FIG. 16 is a schematic diagram showing a system of a front-wheel-drive-based four-wheel drive hybrid electric vehicle with a regenerative braking control apparatus in accordance with a second embodiment.

Referring now to FIGS. 16 and 17, there is shown a regenerative braking control apparatus and method in accordance with a second embodiment. In the second embodiment, the regenerative braking control is applied to the four-wheel drive hybrid electric vehicle based on front-wheel drive vehicle. FIG. 16 is a schematic diagram showing a system of a front-wheel-drive-based four-wheel drive hybrid electric vehicle with a regenerative braking control apparatus in accordance with a second embodiment. First, the following describes the drive system of the hybrid electric vehicle. As shown in FIG. 16, the drive system of the hybrid electric vehicle includes engine E, first motor generator MG1, second motor generator MG2, output sprocket OS, power split mechanism TM, a front wheel drive system, and a rear-wheel drive system. The front wheel drive system includes a front differential 40, a left front drive shaft 41, a right front drive shaft 42, a front left wheel 43, and a front right wheel 44. The rear wheel drive system includes a third motor generator MG3, a differential mechanism 45, a left rear drive shaft 46, a right rear drive shaft 47, a left rear wheel 48, and a right rear wheel 49.

As first motor generator MG1 and second motor generator MG2, third motor generator MG3 is formed as a synchronous motor generator, which includes a rotor embedded in with a permanent magnet, and a stator wound around with a stator coil. Third motor generator MG3 is controlled by applying a three phase alternating current generated by a rear power control unit 3R in accordance with a control command from motor generator controller 2. Third motor generator MG3 is configured to operate as an electric motor to rotate by electric power from a battery 4, and to operate as an electric generator to generate an electromotive force between the both ends of the stator coil to charge battery 4 with electric energy while the rotor is rotating by external force.

Differential mechanism 45 may be a normal differential arranged to distribute the driving/braking power produced by third motor generator MG3 equally to left and right rear wheels 48 and 49, or may be a mechanism arranged to distribute the driving/braking power produced by third motor generator MG3 to left and right rear wheels 48 and 49 with a variable distribution ratio adjusted according to a desired distribution ratio.

The control system of the four-wheel drive hybrid electric vehicle of the second embodiment includes motor controller 2, a front power control unit 3F, rear power control unit 3R, rechargeable battery 4, and integrated controller 6, as shown in FIG. 16. Thus, power control unit 3 consists of front power control unit 3F and rear power control unit 3R. The other basic configuration is the same as in the first embodiment.

In the second embodiment, the hybrid electric vehicle includes a front regeneration mode where regenerative braking is performed only at left and right front wheels 33 and 34, and a four wheel regeneration mode where regenerative braking is performed at left and right front wheels 33 and 34, and left and right rear wheels 48 and 49. The two regeneration modes are each selected according to the driving conditions of the vehicle.

The following describes operations of the regenerative braking control apparatus of the second embodiment. FIG. 17 is a flow chart showing a process of the regenerative braking control performed by brake controller 5 in the second embodiment. Steps S21 to S32 in the flow chart of FIG. 17 are corresponding to steps S1 to S12 in the flow chart of FIG. 11.

Subsequent to step S31, at step S33, brake controller 5 determines whether or not the vehicle is operating in the front regeneration mode. When the answer to step S33 is YES, the routine proceeds to step S32. On the other hand, when the answer to step S33 is NO, the routine proceeds to step S34.

At step S34, brake controller 5 computes a front final output regenerative braking torque and a rear final output regenerative braking torque by setting a limit value for front regenerative braking force and a limit value for rear regenerative braking force in proportion to an actual front-rear regenerative braking force distribution, based on wheel speed deviation ESTUNDER. Subsequent to step S34, the routine proceeds to step S32.

The following describes effects produced by the restriction of regenerative braking torque in cornering braking in accordance with the second embodiment. In cornering braking without intervention of vehicle behavior controls in the front regeneration mode, the control process proceeds in the flow chart of FIG. 17, in order of steps S21, S22, S23, S24, S25, S27, S28, S29, S30, S31, S33, and S32. This restriction control process is substantially same as in the front-wheel drive hybrid electric vehicle of the first embodiment. Accordingly, the regenerative braking control apparatus of the four-wheel drive hybrid electric vehicle of the second embodiment wherein the front regenerative braking is prioritized higher than hydraulic braking and the restriction of regenerative braking torque is strengthened with increase in the simply estimated amount of understeer, is effective for achieving a high level of compatibility of the actual fuel economy of the vehicle and the cornering behavior stability of the vehicle.

On the other hand, in cornering braking without intervention of vehicle behavior controls in the four wheel regeneration mode, the control process proceeds in the flow chart of FIG. 17, in order of steps S21, S22, S23, S24, S25, S27, S28, S29, S30, S31, S33, S34, and S32. Accordingly, the regenerative braking control apparatus of the four-wheel drive hybrid electric vehicle of the second embodiment wherein the front final output regenerative braking torque and the rear final output regenerative braking torque are computed by setting a limit value for front regenerative braking force and a limit value for rear regenerative braking force in accordance with the actual front-rear regenerative braking force distribution, is effective for minimizing fluctuations in the regenerative braking force between an inactive state and an active state of the regenerative braking force limitation, to enhance the braking performance of the vehicle.

The regenerative braking control apparatus and method of the second embodiment produce the following effects and advantages (7) and (8) in addition to the effects and advantages (1) through (6) as described in the first embodiment.

(7) The regenerative braking control apparatus wherein the regenerative braking unit (2, 3, 4, MG1, MG2, TM, OS, CB) is arranged to produce the regenerative braking effort for the front wheel set and the rear wheel set, and wherein the control unit (5, 6) is configured to control the regenerative braking effort to decrease with an increase in the wheel speed deviation (ESTUNDER) during cornering braking in a first mode where the regenerative braking effort for one of the front wheel set and the rear wheel set is inhibited, is effective for achieving a high level of compatibility of the actual fuel economy of the vehicle and the cornering behavior stability of the vehicle.

(8) The regenerative braking control apparatus wherein the control unit (5, 6) is configured to perform the following: adjusting an upper limit (REGELIM) to decrease with an increase in the wheel speed deviation (ESTUNDER); dividing the upper limit (REGELIM) between a front upper limit and a rear upper limit in proportions of the regenerative braking effort for the front wheel set and the regenerative braking effort for the rear wheel set; and limiting the regenerative braking effort for the front wheel set and the regenerative braking effort for the rear wheel set with the front upper limit and the rear upper limit, respectively, during cornering braking in a second mode where the regenerative braking effort for the front wheel set and the regenerative braking effort for the rear wheel set are allowed, is effective for reducing fluctuations in the regenerative braking force between an inactive state and an active state of the regenerative braking force limitation, to enhance the braking performance of the vehicle.

Although the regenerative braking torque is limited by an upper limit according to an estimated amount of understeer in the first and second embodiments, the regenerative braking torque may be adjusted to decrease by computing a negative adjustment value according to the estimated amount of understeer. The regenerative braking torque may be adjusted to be zero, or may be adjusted stepwise, or may be adjusted stepless.

Although the driving condition including intention of driving straight is detected using the measured steering angle, yaw rate, and lateral acceleration in the first and second embodiments, it may be detected using one of the above parameters, or using additional parameters such as wheel speeds, or using GPS data to determine whether the vehicle is in cornering or in straight running.

Although assuming ABS, TCS, and VDC as the vehicle behavior control systems in the first and second embodiments, it is optional to avoid control interference with any other vehicle control systems such as steering control systems and suspension control systems.

Although a hydraulic brake system based on brake fluid pressure is employed as a mechanical braking system in the first and second embodiments, the mechanical braking system may be implemented by any other mechanical braking system such as an electric motor brake (EMB) that is based on no regenerative braking torque.

Although the regenerative braking control is applied to the front-wheel drive hybrid electric vehicle provided with one engine, two motor generators, and one power split mechanism in the first embodiment, and the regenerative braking control is applied to the four-wheel drive hybrid electric vehicle based on front-wheel drive in the second embodiment, the regenerative braking control is applicable to rear-wheel drive hybrid electric vehicles, electric vehicles, fuel cell vehicles, four-wheel drive hybrid electric vehicles based on rear-wheel drive, four-wheel drive electric vehicles, and four-wheel drive fuel cell vehicles. That is, the regenerative braking control is applicable to vehicles provided with a regenerative braking control system including a mode where regenerative braking is performed only at one of front and right wheels in accordance with slowdown request operation.

This application is based on a prior Japanese Patent Application No. 2005-61298 filed on Mar. 4, 2005. The entire contents of this Japanese Patent Application No. 2005-61298 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A regenerative braking control apparatus for a wheeled vehicle, comprising:
   a regenerative braking unit arranged to produce a regenerative braking effort for the vehicle; and
   a control unit connected for signal communication to the regenerative braking unit, and configured to perform the following:
      measuring a wheel speed deviation defined as a difference between a speed of a front wheel set of the vehicle and a speed of a rear wheel set of the vehicle; and
      controlling the regenerative braking effort in accordance with the wheel speed deviation during cornering,
      adjusting an upper limit of the regenerative braking effort in such a manner that the upper limit decreases with an increase in the wheel speed deviation; and
      limiting the regenerative braking effort with the upper limit during cornering.

2. The regenerative braking control apparatus as claimed in claim 1, wherein the control unit is configured to perform braking for the vehicle in accordance with an operation of slowdown request, prioritizing a regenerative braking effort for one of the front wheel set and the rear wheel set of the vehicle.

3. The regenerative braking control apparatus as claimed in claim 1, wherein the control unit is configured to determine the wheel speed deviation as a difference between an average speed of a non-regenerative-braking-applied wheel set of the vehicle and a speed of a regenerative-braking-applied outside wheel of the vehicle during cornering.

4. The regenerative braking control apparatus as claimed in claim 1, wherein the control unit is configured to hold the upper limit for the regenerative braking effort constant in a region where the wheel speed deviation is larger than or equal to a predetermined threshold.

5. The regenerative braking control apparatus as claimed in claim 1, wherein the control unit is configured to perform the following:
   determining whether or not the vehicle is traveling straight; and
   inhibiting the controlling the regenerative braking effort, when it is determined that the vehicle is traveling straight.

6. The regenerative braking control apparatus as claimed in claim 1, wherein the control unit is configured to inhibit the controlling the regenerative braking effort, when an intervention of a control for dynamic behavior of the vehicle is present.

7. The regenerative braking control apparatus as claimed in claim 1, wherein the regenerative braking unit is arranged to produce the regenerative braking effort for the front wheel set and the rear wheel set, and wherein the control unit is configured to control the regenerative braking effort in such a manner that the regenerative braking effort decreases with an increase in the wheel speed deviation during cornering braking in a first mode where the regenerative braking effort for one of the front wheel set and the rear wheel set is inhibited.

8. The regenerative braking control apparatus as claimed in claim 7, wherein the control unit is configured to perform the following:
   adjusting an upper limit in such a manner that the upper limit decreases with an increase in the wheel speed deviation;
   dividing the upper limit between a front upper limit and a rear upper limit in proportions of the regenerative braking effort for the front wheel set and the regenerative braking effort for the rear wheel set; and
   limiting the regenerative braking effort for the front wheel set and the regenerative braking effort for the rear wheel set with the front upper limit and the rear upper limit, respectively, during cornering braking in a second mode where the regenerative braking effort for the front wheel set and the regenerative braking effort for the rear wheel set are allowed.

9. A regenerative braking control apparatus for a wheeled vehicle, comprising:
   a regenerative braking unit arranged to produce a regenerative braking effort for the vehicle; and
   a control unit connected for signal communication to the regenerative braking unit, and configured to perform the following:
      measuring a wheel speed deviation defined as a difference between a speed of a front wheel set of the vehicle and a speed of a rear wheel set of the vehicle; and
      controlling the regenerative braking effort in accordance with the wheel speed deviation during cornering;
   wherein the regenerative braking unit is arranged to produce the regenerative braking effort for the front wheel set, and wherein the control unit comprises:
      a desired regenerative braking torque processing module configured to determine a desired regenerative braking torque in accordance with an operation of slowdown request;
      a regenerative braking torque limit computing section configured to determine the wheel speed deviation, and to determine an upper limit in such a manner that the upper limit decreases with an increase in the wheel speed deviation; and
      a final output regenerative braking torque processing module configured to select a lower one of the desired regenerative braking torque and the upper limit as a setpoint of the regenerative braking effort.

10. A braking control apparatus for a vehicle, comprising:
   a non-regenerative braking unit arranged to produce a non-regenerative braking effort for the vehicle;
   a regenerative braking unit arranged to produce a regenerative braking effort for the vehicle; and
   a control unit connected for signal communication to the non-regenerative braking unit and the regenerative braking unit, and configured to perform the following:
      determining a desired regenerative braking effort in accordance with an operation of slowdown request;
      determining an undesirability indicator indicative of a degree of undesirability of cornering behavior of the vehicle under influence of the regenerative braking effort;
      controlling the regenerative braking effort in accordance with the desired regenerative braking effort and the undesirability indicator during cornering;
      controlling the non-regenerative braking effort in accordance with the desired regenerative braking effort and the controlled regenerative braking effort;
      defining the undesirability indicator in such a manner that the undesirability indicator tends to increase with an increase in the regenerative braking effort;
      adjusting an upper limit of the regenerative braking effort in such a manner that the upper limit decreases with an increase in the undesirability indicator; and
      limiting the regenerative braking effort with the upper limit during cornering.

11. The braking control apparatus as claimed in claim 10, wherein the control unit is configured to define the undesirability indicator as a deviation from a desired steer characteristic of the vehicle.

12. A regenerative braking control apparatus for a wheeled vehicle, comprising:
- regenerative braking means for producing a regenerative braking effort for the vehicle; and
- control means for performing the following:
  - measuring a wheel speed deviation defined as a difference between a speed of a front wheel set of the vehicle and a speed of a rear wheel set of the vehicle; and
  - controlling the regenerative braking effort in accordance with the wheel speed deviation during cornering;
  - adjusting an upper limit of the regenerative braking effort in such a manner that the upper limit decreases with an increase in the wheel speed deviation; and
  - limiting the regenerative braking effort with the upper limit during cornering.

13. A regenerative braking control method for a wheeled vehicle comprising a regenerative braking unit arranged to produce a regenerative braking effort for the vehicle, the regenerative braking control method comprising:
- measuring a wheel speed deviation defined as a difference between a speed of a front wheel set of the vehicle and a speed of a rear wheel set of the vehicle;
- controlling the regenerative braking effort in accordance with the wheel speed deviation during cornering;
- adjusting an upper limit of the regenerative braking effort in such a manner that the upper limit decreases with an increase in the wheel speed deviation; and
- limiting the regenerative braking effort with the upper limit during cornering.

* * * * *